(12) United States Patent
Volk et al.

(10) Patent No.: US 7,058,959 B2
(45) Date of Patent: Jun. 6, 2006

(54) OPTICAL DISC DRIVE COMPATIBLE WITH MEMORY CARD SLOT

(75) Inventors: Steven B. Volk, Boulder, CO (US); Thomas E. Berg, Fort. Collins, CO (US)

(73) Assignee: Vmedia Research, Inc., Boulder, CO (US)

( * ) Notice: Subject to any disclaimer, the term of this patent is extended or adjusted under 35 U.S.C. 154(b) by 186 days.

(21) Appl. No.: 10/423,701

(22) Filed: Apr. 25, 2003

(65) Prior Publication Data

US 2004/0213095 A1    Oct. 28, 2004

(51) Int. Cl.
*G11B 7/00* (2006.01)

(52) U.S. Cl. .................... 720/630; 369/30.63

(58) Field of Classification Search .............. 720/630, 720/640; 360/99.02, 99.06, 131; 361/683–686
See application file for complete search history.

(56) References Cited

U.S. PATENT DOCUMENTS

| | | | | |
|---|---|---|---|---|
| 6,137,759 | A * | 10/2000 | Ogiro et al. | 720/640 |
| 6,185,069 | B1 * | 2/2001 | Schick | 360/133 |
| 6,525,932 | B1 * | 2/2003 | Ohnishi et al. | 361/686 |
| 6,751,694 | B1 * | 6/2004 | Liu et al. | 710/301 |
| 6,813,661 | B1 * | 11/2004 | Li | 710/62 |
| 6,826,018 | B1 * | 11/2004 | Kuwajima et al. | 360/254.3 |
| 6,873,524 | B1 * | 3/2005 | Kaczeus et al. | 361/685 |

FOREIGN PATENT DOCUMENTS

WO    WO 00/74049 A1 *  12/2000

* cited by examiner

Primary Examiner—Angel Castro
(74) Attorney, Agent, or Firm—Silicon Valley Patent Group LLP

(57) ABSTRACT

A disc drive designed to hold a cartridge containing an optical data storage disk is compatible with a memory card slot in a host digital electronics device such as a PDA, for example a slot designed for a Type I CompactFlash card. The disc drive contains a body assembly which is inserted into the memory card slot and which has a compatible connector at one end. The disc drive also includes a drive mechanism which contains the spindle motor and optics systems and which is located outside the memory card slot when the drive is in operation. The drive mechanism is lifted from the body assembly to form an opening to a tray into which a cartridge is loaded. The drive mechanism is then pressed against the body assembly to close the cartridge tray and to cause the spindle motor assembly to engage the optical disc within the cartridge. To minimize the extent to which the disc drive protrudes from the host device, part of the cartridge extends into the memory card slot when the disc drive is connected to the host.

20 Claims, 34 Drawing Sheets

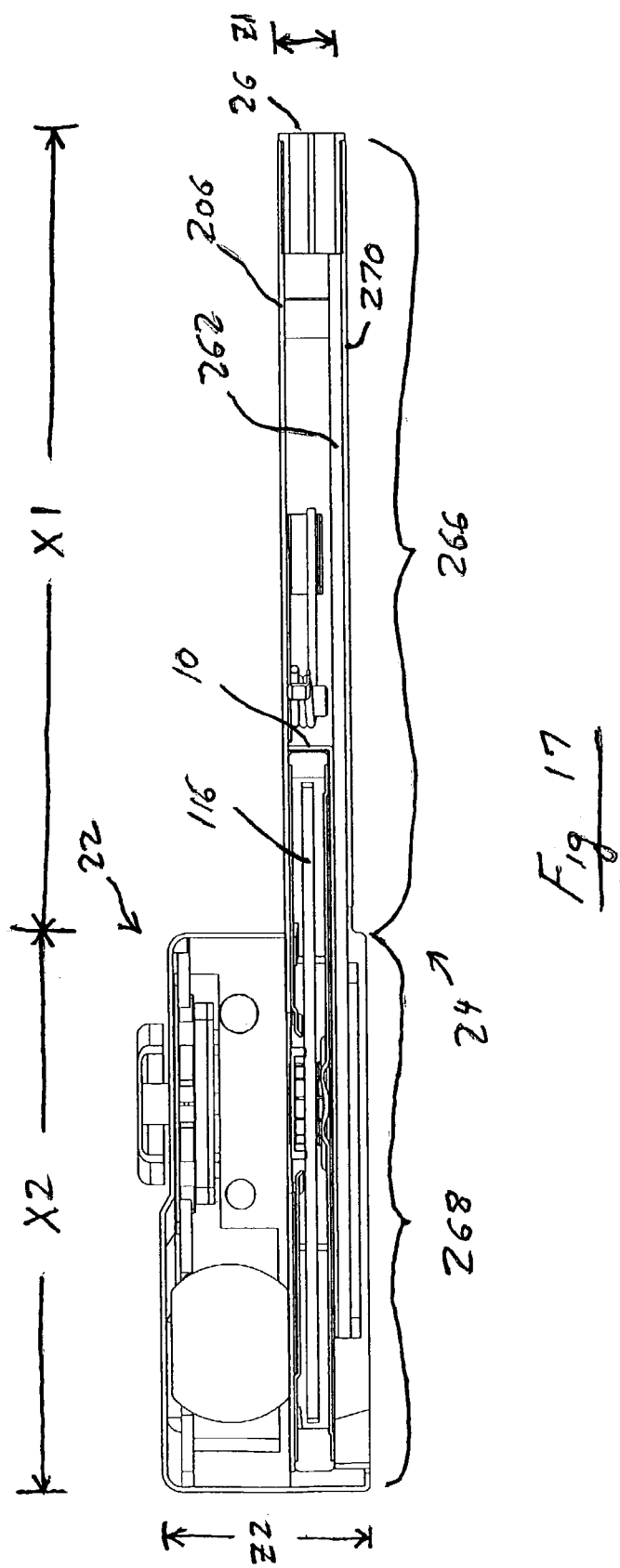

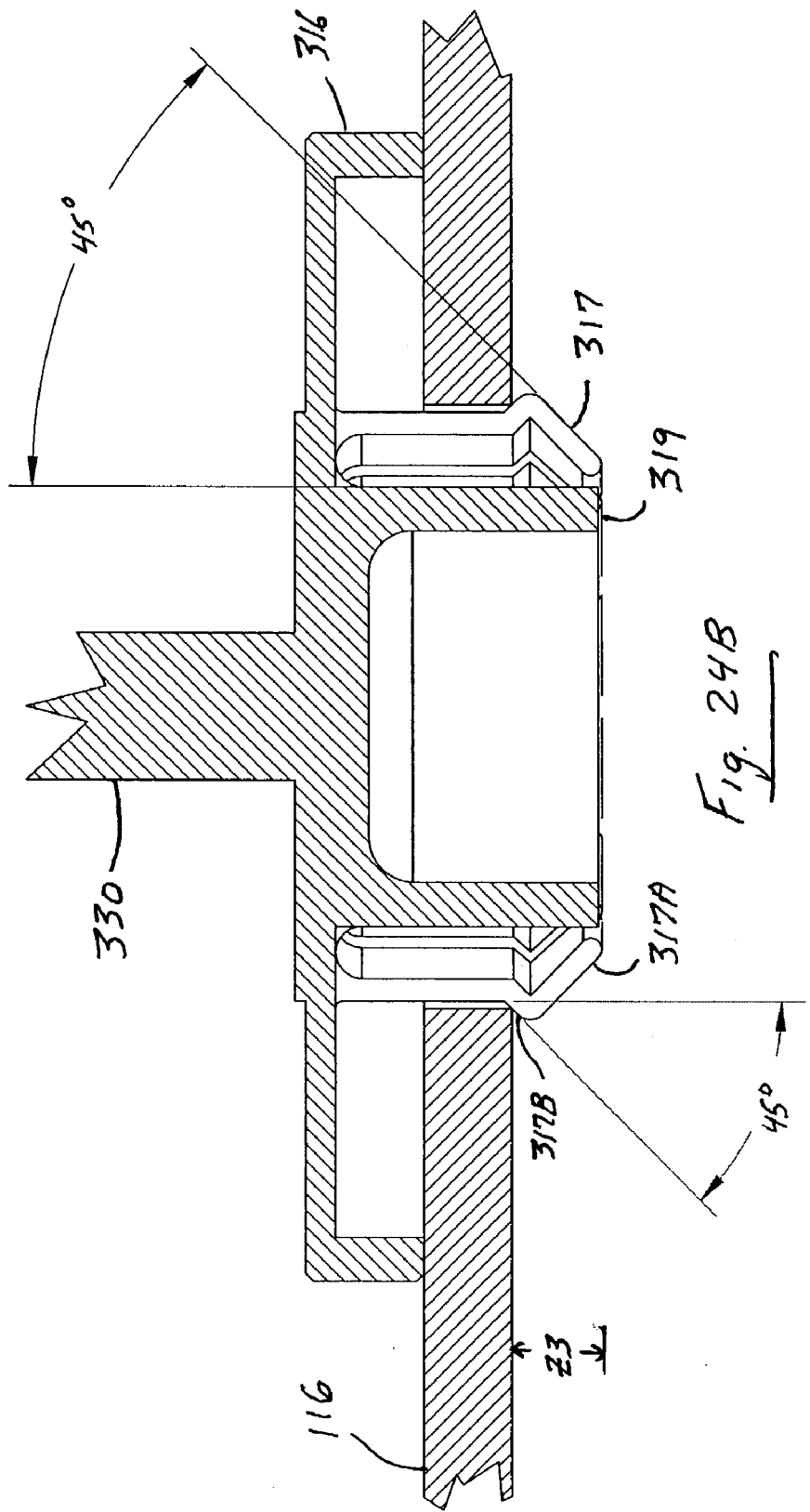

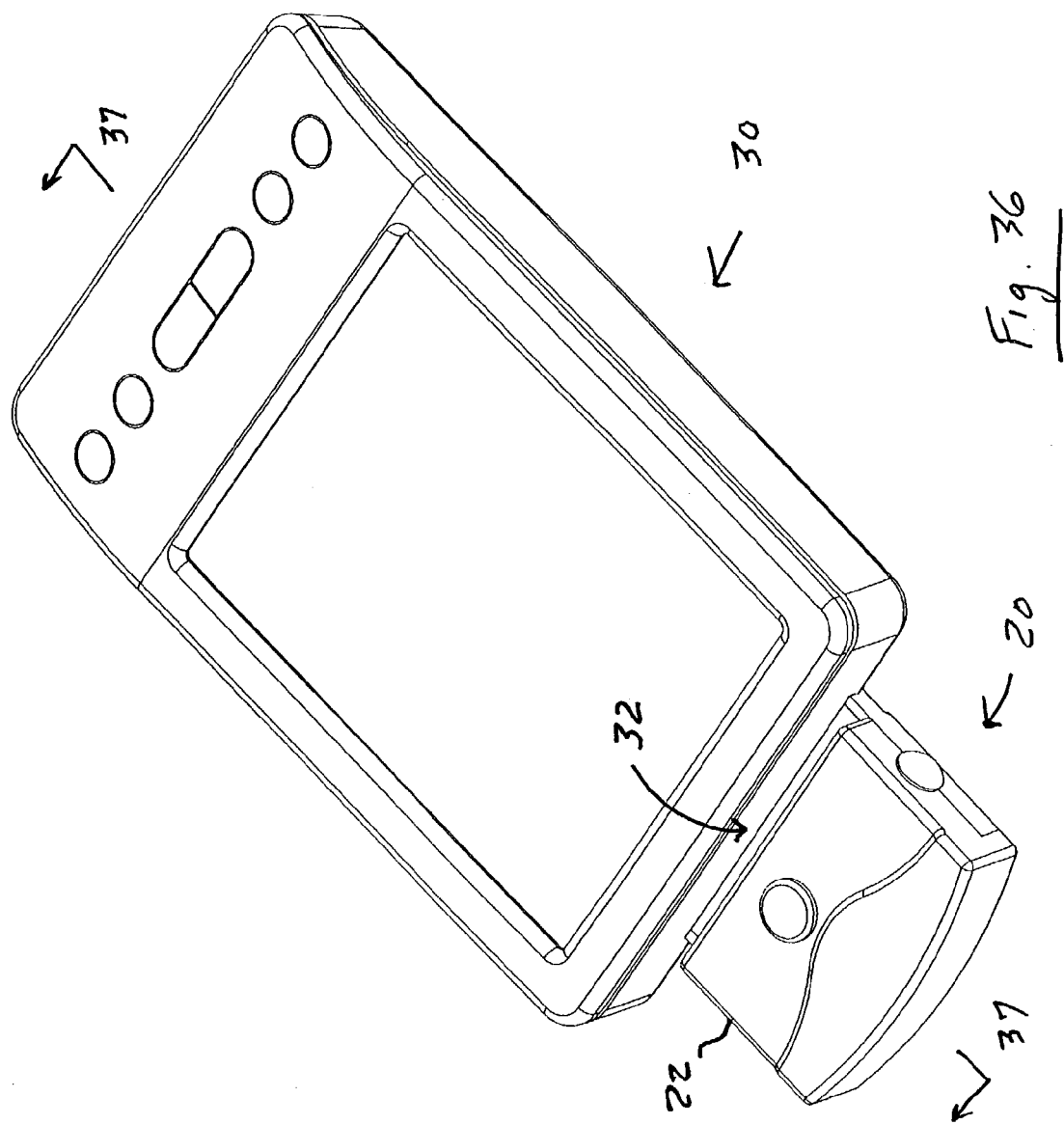

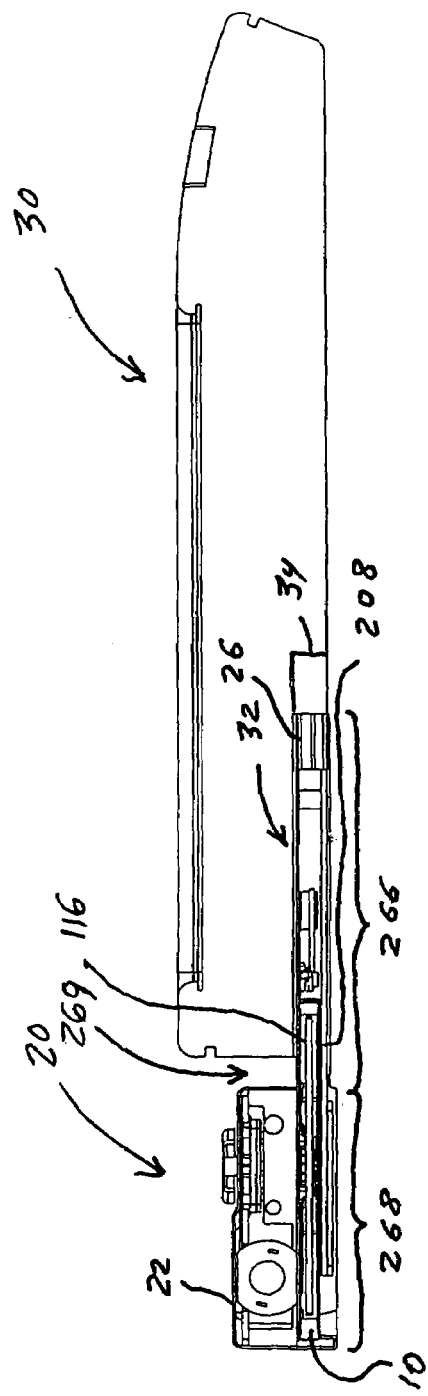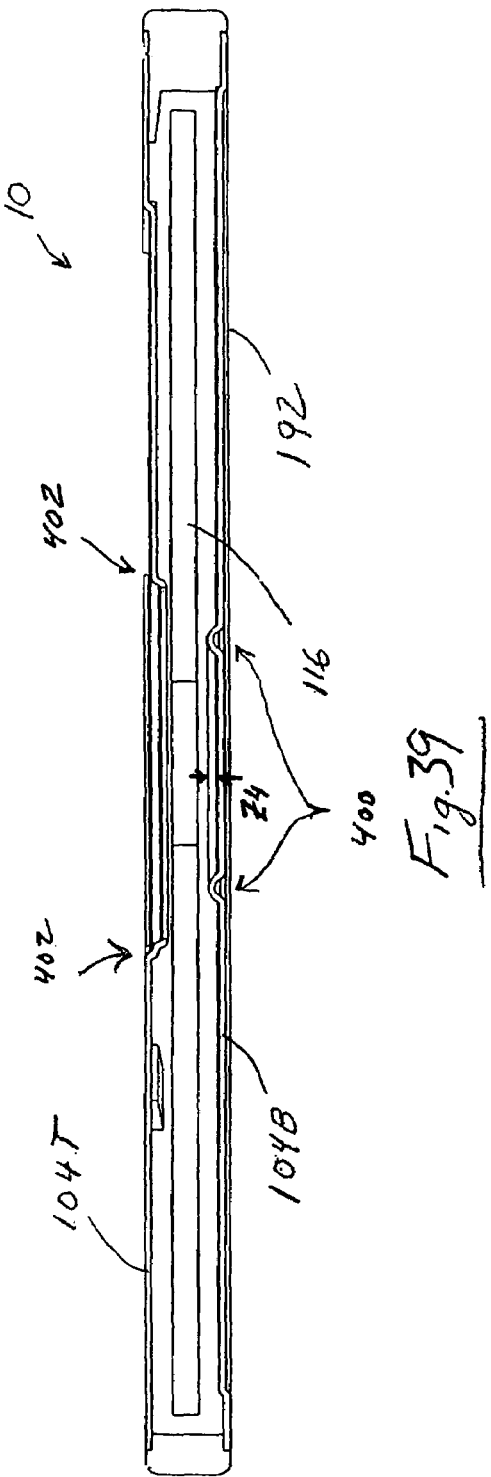

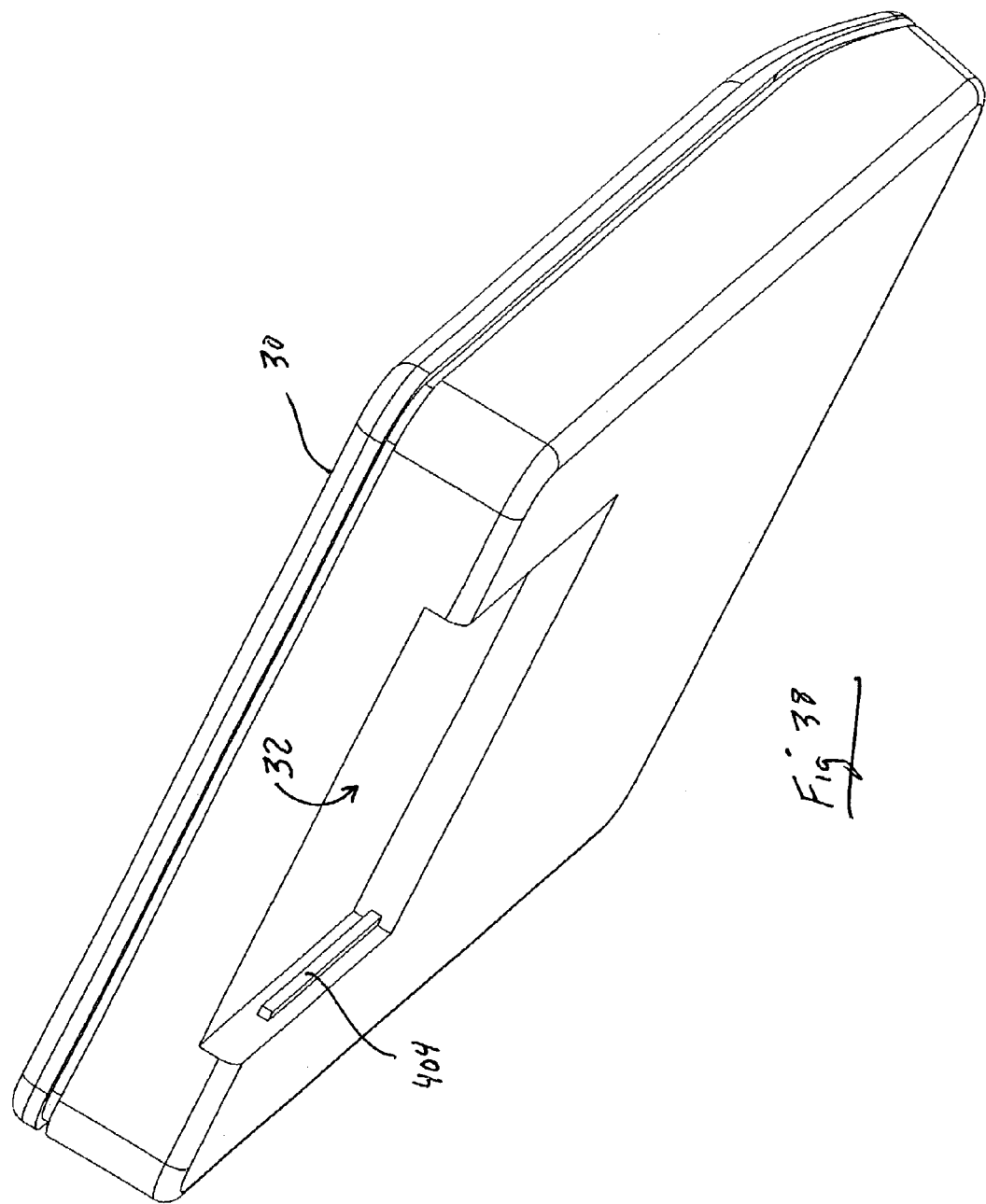

OPTICAL DISC DRIVE COMPATIBLE WITH MEMORY CARD SLOT

CROSS-REFERENCE TO RELATED APPLICATION

This application is related to application Ser. No. 10/423,097, which is co-owned and filed concurrently herewith, and which is incorporated herein by reference in its entirety.

FIELD OF THE INVENTION

This invention relates to high-volume data storage and, in particular, to a disc drive that is compatible with an industry-standard memory card slot of the kind found in portable computing devices.

BACKGROUND OF THE INVENTION

Consumer entertainment technologies are moving towards high resolution color displays for mobile entertainment. Increasingly, consumers want to take their entertainment with them. Cross-country travelers and cross-town commuters are eagerly pursuing gaming, music and video entertainment activities on cell phones, personal digital assistants (PDAs) and portable computers. At present, however, the entertainment experience is limited, even primitive, compared to what consumers have come to expect from their game consoles, home theaters and DVD-equipped computers.

The main problem is data storage. The fact is that sophisticated digital entertainment is data-intensive, and it is growing more so every day. Traditional small "form factor," portable media such as CompactFlash® cards, SD® flash cards, Memory Stick™ and other solid state memory devices simply cannot deliver the capacity and price per megabyte required for a high-quality entertainment experience. Recording content onto solid state memory cards in high volume is expensive and impractical, and securing that content effectively is very difficult.

While some experts predict that broadband Internet access will deliver high-quality games and movies to mobile consumer electronics devices, there are significant barriers to success. Cell phone networks are designed to transmit voice communications and are simply not efficient for high-capacity data transmission. Cell connections are not capable of the required speeds and are notoriously unreliable, with frequent dead zones and dropped connections. While games are being delivered to cell phones currently, the quality of game play and the game environment cannot begin to approach that of a console.

WiFi, or 802.11, wireless is designed for data transmission, and the growing number of WiFi hotspots looks attractive on the surface for delivering large amounts of data to mobile devices. Internet access and email application for multiple users are easily accommodated by WiFi. Nonetheless, managing streaming and interactive content such as multiplayer games and high-quality video or movies for thousands, if not millions, of users simultaneously will be challenging for any network. Security is also a problem for WiFi, leaving content providers open to potential piracy.

Moreover, the data storage problem would still exist. For any sort of networked delivery system to be viable, mobile consumer devices will have to embed significant amounts of storage to hold large, downloaded game and movie files, and to track a player's progress within the game. Perhaps the most significant problem for networked content delivery is cost. It has been estimated that it can cost more than $30 to send a DVD-quality film over the Internet.

Disc-based distribution costs are far lower. Even more compelling is the fact that consumers have consistently demonstrated their preference for purchasing high-value content on discs, as evidenced by the recent upswing in DVD sales. Moreover, optical discs are molded and can therefore be replicated at less expense than solid state memory devices.

Clearly, the mobile entertainment industry needs an economical, small form factor, secure storage technology to meet the growing demand for a portable, high-quality entertainment experience. In addition, it is anticipated that a storage device capable of holding large amounts of data would find application in other areas, such as in portable computers used in connection with the homeland security effort.

SUMMARY OF THE INVENTION

This invention melds the convenience and versatility of memory cards with the data storage capacity of optical discs. A drive for an optical data storage disc is made in a form that is compatible with a standard memory card slot used widely in PDAs and other portable digital devices.

The disc drive of this invention comprises a body assembly and a drive mechanism. The body assembly is shaped and sized so as to fit into a standard memory card slot. A connector compatible with the memory slot is positioned at a first end of the body assembly. The body assembly also includes a cartridge tray for receiving a cartridge that contains an optical data storage disc (sometimes referred to as an "optical disc").

The drive mechanism includes a spindle motor assembly for rotating the disc and an optics system for reading data from the disc. The drive mechanism is attached to a second end of the body assembly that is opposite to the first end where the connector is located. The drive mechanism moves between an open position and a closed position. Before a cartridge is inserted into the drive, the drive mechanism is moved to the open position, and after the cartridge has been inserted into the drive, the drive mechanism is moved to the closed position. Moving the drive mechanism to the closed position causes a collet to extend into a central hole of the optical disc. When the drive mechanism has been fully closed, the collet grips the edges of the central hole thereby enabling the spindle motor to spin the disc. In one embodiment a manual force is used to move the drive mechanism from the open position to the closed position, eliminating the need for a separate motor and mechanism to perform this function.

In one embodiment, when the cartridge has been inserted into the drive, a portion of the cartridge and optical disc extends into the memory card slot. In this way the portion of the drive that extends beyond the entrance to the card slot is minimized.

The optical disc rotates at a relatively slow speed (e.g., 400–500 rpm) as compared with magnetic discs, which rotate at 5000–7000 rpm, for example. Therefore the power requirements of the disc drive of this invention are relatively modest (e.g., 100 mWatts). In comparison, a magnetic micro disc drive may consume on the order of 1 Watt of power. This makes the disc drive of this invention more useful with portable electronics devices such as PDAs, where power consumption is an issue.

The drive is preferably compatible with a slot that is designed to accept a CompactFlash® CF Type I card, a small form factor card used in many PDA devices. To meet this specification the portion of the body assembly that extends into the card slot has a width of approximately 36 mm and a thickness of approximately 3.3 mm. Rails that are integral with the body assembly slide along the sides of the CompactFlash slot, and a standard CompactFlash 50-pin connector is used to provide the electrical connections to the host device.

BRIEF DESCRIPTION OF THE DRAWINGS

FIG. 17 is a cross-sectional view of the disc drive.

FIG. 24B is a detailed view of the expandable collet that is used to grip the central hole of the disc.

FIG. 36 illustrates a disc drive of this invention inserted into a personal digital assistant (PDA).

FIG. 37 is a cross-sectional view of the disc drive and PDA shown in FIG. 36.

FIG. 38 is a bottom view of the PDA without the disc drive, showing the characteristics of the memory card slot.

FIG. 39 shows a cross-sectional view of an optical disc cartridge that can be played in the disc drive.

DESCRIPTION OF THE INVENTION

Figure 1:
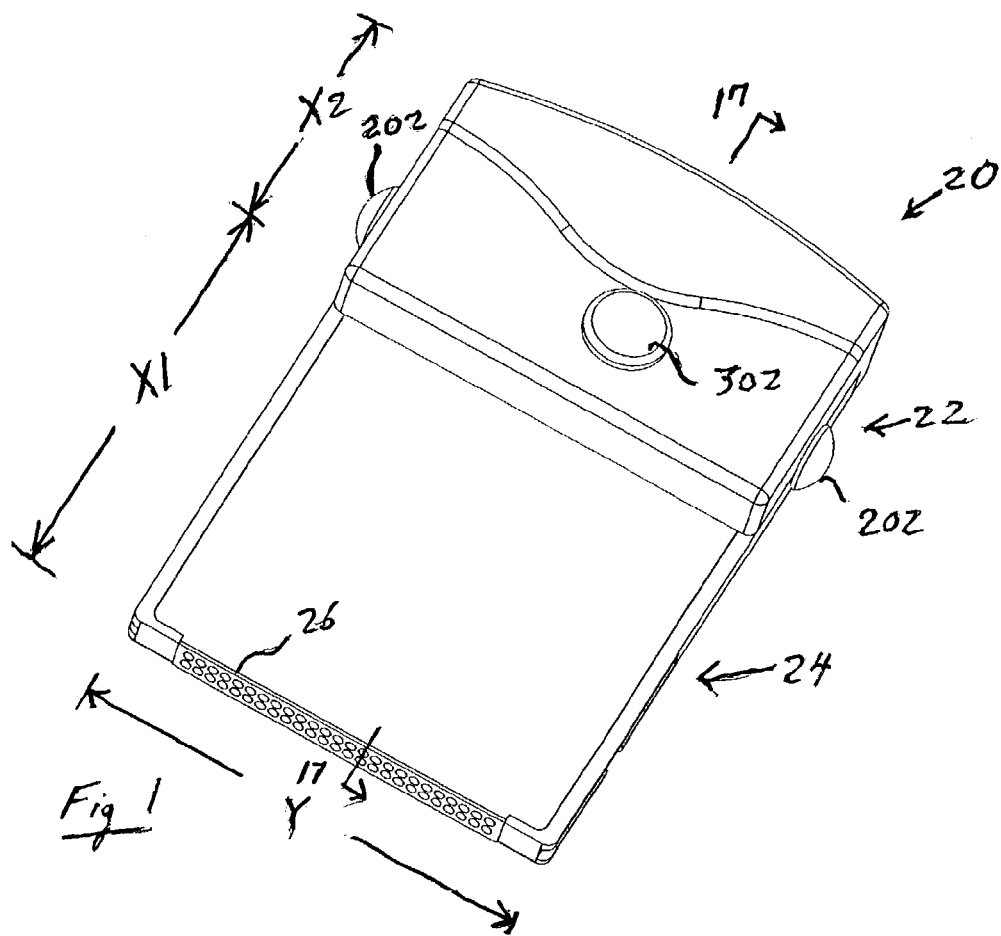
FIG. 1 is a view of the disc drive of this invention.

FIG. 1 shows a perspective view of a disc drive 20 according to this invention. Disc drive 20 includes a drive mechanism or "pod" 22 and a body assembly 24. Drive mechanism 22 includes the mechanical and optical components of disk drive 20, described below. Body assembly 24 is sized and shaped to fit into an industry-standard memory card slot, in this case a slot designed to accept a Type I CompactFlash® storage card, used in many PDA devices. A Type I CompactFlash card has 50 pins and measures 42.8 mm (1.7")×36.4 mm (1.4")×3.3 mm (0.13"). The CompactFlash specification can be obtained at http://www.compactflash.org/specd11.htm or from the CompactFlash Association P.O. Box 51537, Palo Alto, Calif. 94303. (See CF+ and CompactFlash Specification Revision 1.4, incorporated herein by reference in its entirety.) This invention is not limited to any particular type of slot, however. In other embodiments, the body can be designed to fit other types of slots. The dimension X1 of body assembly 24 is actually inserted into the slot; the remaining portion, denoted by dimension X2 protrudes from the slot and therefore can be somewhat thicker. It is desirable to that the dimension X2 be as small as possible, however, to minimize the amount of "overhang" from the PDA or other device into which disc drive 20 is inserted. Thus, a key feature of this design is that it is compatible with a standard Type I CompactFlash® slot on existing and future PDA devices, and adds as little volume and physical extension to the outside of such a device as we have found practicable, while allowing removable media to be inserted in this device for variable program material.

In one embodiment the dimension X1 is approximately 40 mm and the dimension X2 is approximately 28 mm. The width Y of disc drive 20 is 42.8 mm and the thickness Z1 (see FIG. 17) is approximately 3.3 mm. Since the dimension of a Type I CompactFlash® card in the insertion direction is 36.4 mm, a clearance of 3–4 mm (40–36.4) is allowed between the lateral face of drive mechanism 22 and the adjacent surface of a host device such as a PDA. While the embodiment described herein is compatible with a Type I CompactFlash slot, it will be understood that consonant with this invention a disc drive may be made compatible with any other type of memory card slot including industry-standard slots such as the Type II CompactFlash and PCMCIA slots.

At one end of body assembly 24 is a connector 26 with a socket arrangement that compatible with a Type 1 CompactFlash® pin arrangement.

Figure 2:
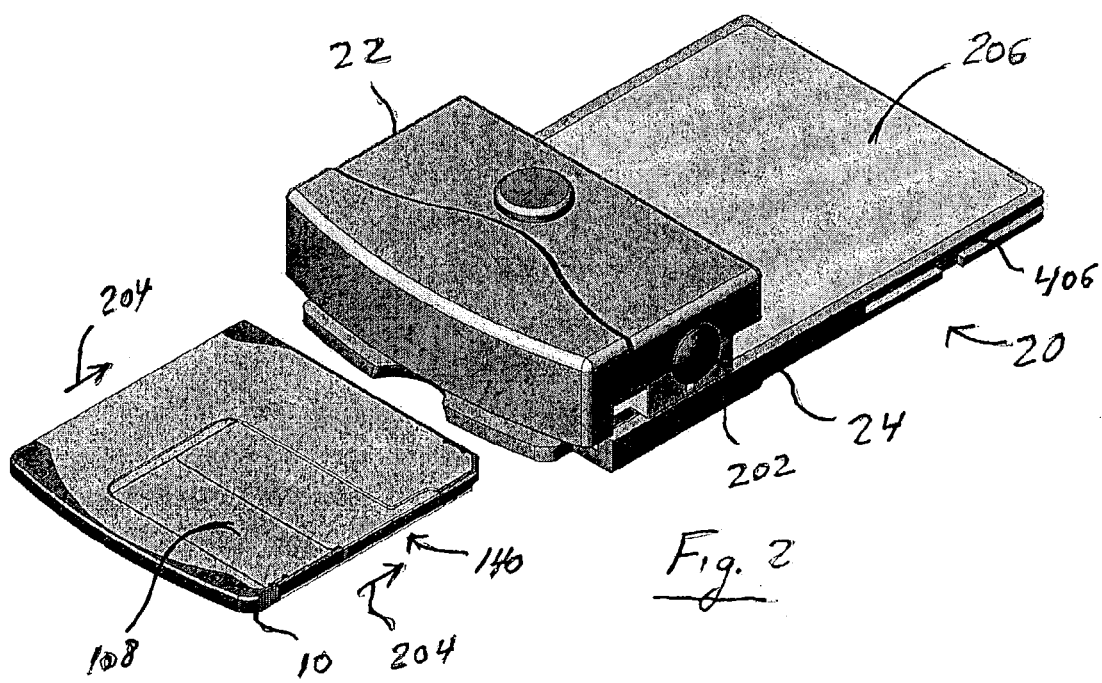
FIG. 2 is a view of the disc drive and a cartridge before insertion of the cartridge into the disc drive.

FIG. 2 shows drive 20 along with a cartridge 10, which includes a shutter 108 on its top side. Cartridge 10 may be a cartridge of the kind described in the above-referenced application Ser. No. 10/423,097, which is designed to hold a 32 mm diameter optical data storage disc, although this is not required.

Cartridge 10 is inserted into disc drive 20 in the direction of arrows 204 shown in FIG. 2. Drive 20 has been opened by squeezing the two "side" release buttons 202 toward one another. Squeezing release buttons 202 releases latches which hold drive mechanism 22 down, and allows a lift spring to move the drive mechanism 22 upward to a stop. That opens a space leading into a cartridge receiver assembly (not shown) and allows the insertion of cartridge 10. Cartridge 10 is presented with the side that includes shutter 108 facing upward, and is inserted into disc drive 20. In the embodiment described, the travel distance of drive mechanism 22 between the open and closed positions is approximately 4 mm.

The cartridge receiver has a fixed "tab" which disengages a shutter latch (not shown), and moves shutter 108 to the open position as it is inserted in drive 20. If the tab does not enter a slot allowing disengagement of the shutter latch, the tab precludes the insertion of cartridge 10 into drive 20. Thus, as described below, presenting cartridge 10 with the opposite (label) side up will result in arrested motion of cartridge 10 at approximately half of the insertion depth.

Linear motion of drive mechanism 22 in a direction perpendicular to the plane of body assembly 24 allows cartridge 10 to be replaced by another cartridge while our drive is inserted into a PDA or other type of digital appliance. In another embodiment, described below, the drive mechanism moves in an arc about a pivot axis transverse to the insertion direction of the drive 20 and parallel to the primary plane of body assembly 24. This approach has some advantages in the areas of simplicity and durability, but it does not as easily allow media exchange while the CompactFlash connector is engaged.

We now describe in detail the components of disc drive 20.

Cartridge Receiver Assembly

Figure 3:
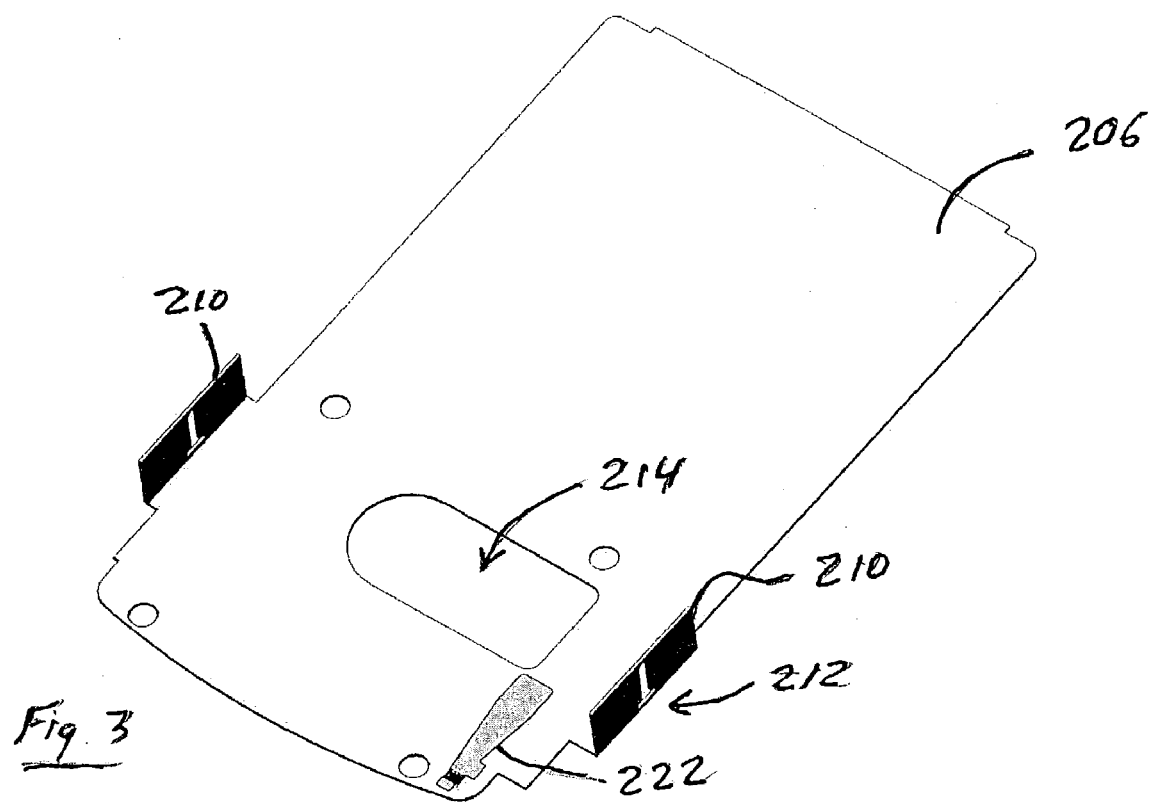
FIG. 3 is a view of the top cover of the body.

The guides for the vertical motion of the drive mechanism 22, as well as the latching details, are integrated into a top cover 206 of body assembly 24, which is preferably formed of sheet metal. FIG. 3 shows top cover 206 with guides 210 extending upward. An inverted T-shaped slot 212 is cut into each of guides 210. Slots 212 serve as locking features. Side release buttons 202 are affixed to leaf springs with features which latch into the transverse portion of the inverted T's and slide along the vertical portion of slots when the locking features are retracted. Also shown in FIG. 3 is an opening 214, which is used for reading the data area of a disc.

Figure 4A:
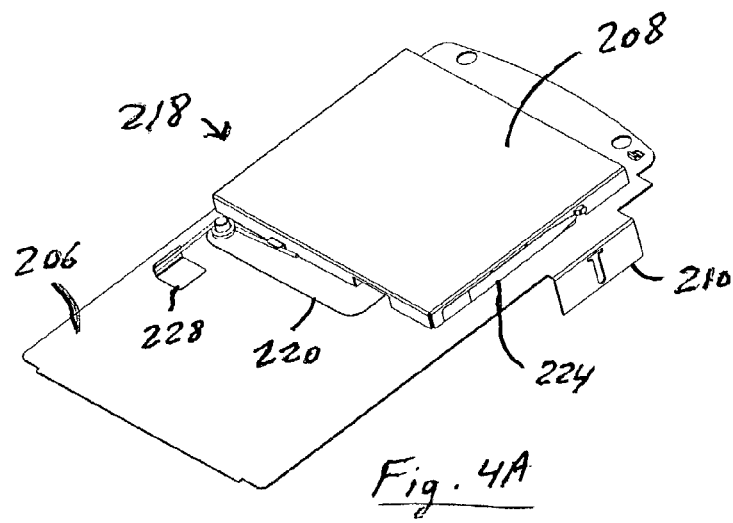
FIG. 4A shows the cartridge receiver assembly, with the eject lever relaxed.
Figure 4B:
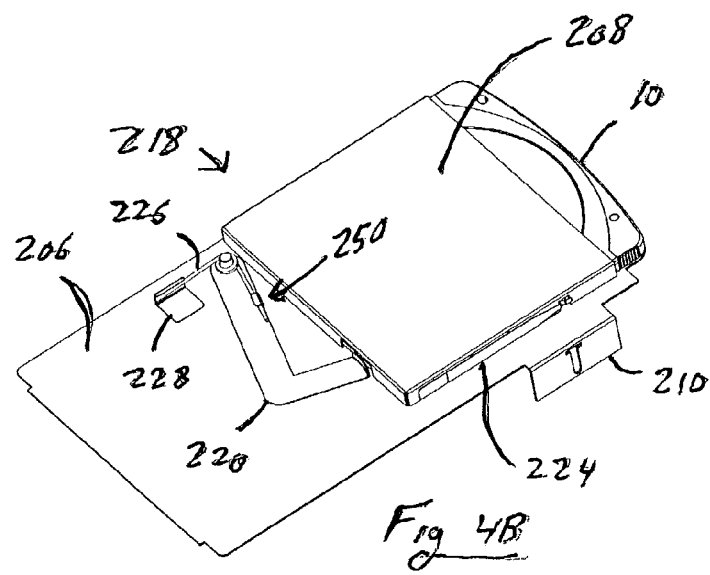
FIG. 4B shows the cartridge receiver assembly, with the cartridge inserted and the eject lever compressed.
Figure 4C:
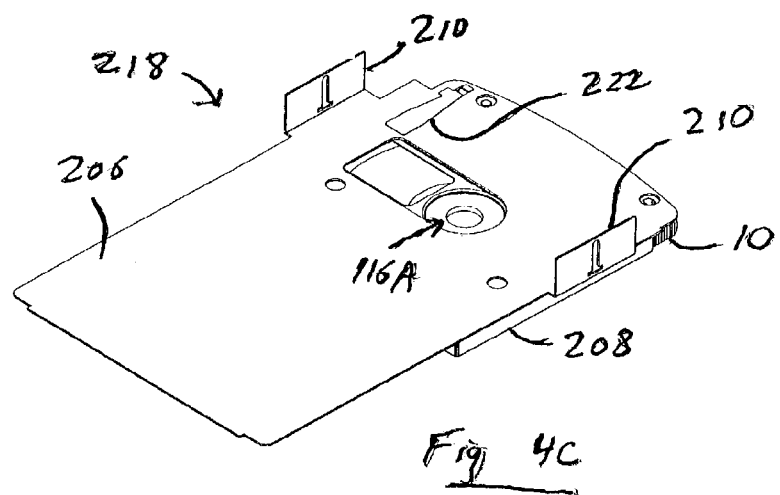
FIG. 4C shows the cartridge receiver assembly, with the cartridge inserted and latched.

Top cover 206 has a cartridge tray 208 and other features attached to it, together comprising a cartridge receiver assembly 218, shown in FIGS. 4A–4C. As shown in FIGS. 4A and 4B, the insertion of cartridge 10 opposes a cartridge eject spring arm 220 at the rear of cartridge tray 208. This may occur, for example, when cartridge 10 approaches within eight millimeters of full insertion. To facilitate removal of cartridge 10, spring arm 220 provides the same eight millimeters of motion to partially eject cartridge 10 from disc drive 20 when the drive mechanism 22 is opened. When cartridge 10 is fully inserted in cartridge tray 208, a retention "barbed" spring 222 restrains the cartridge in the receiver. Spring 222 is visible in FIGS. 3 and 4C near the forward edge of top cover 206. A matching notch in the cartridge engages spring 222 to retain the cartridge in cartridge tray 208.

Referring to FIGS. 4A and 4B, a leaf spring 224 is visible on the side of cartridge tray 208. This is another barbed leaf spring, but with a less aggressive engagement angle on its face than leaf spring 222. Leaf spring 224 provides friction and purchase to ensure that shutter 108 remains in place while cartridge 10 is ejected, thereby ensuring that the shutter latch is reengaged. The friction of leaf spring 224 also prevents cartridge 10 from attaining excessive velocity when it is being ejected by spring arm 220. It is desirable that the cartridge 10 be offered for removal by the user, but not be "launched" from disc drive 20.

Figure 5:
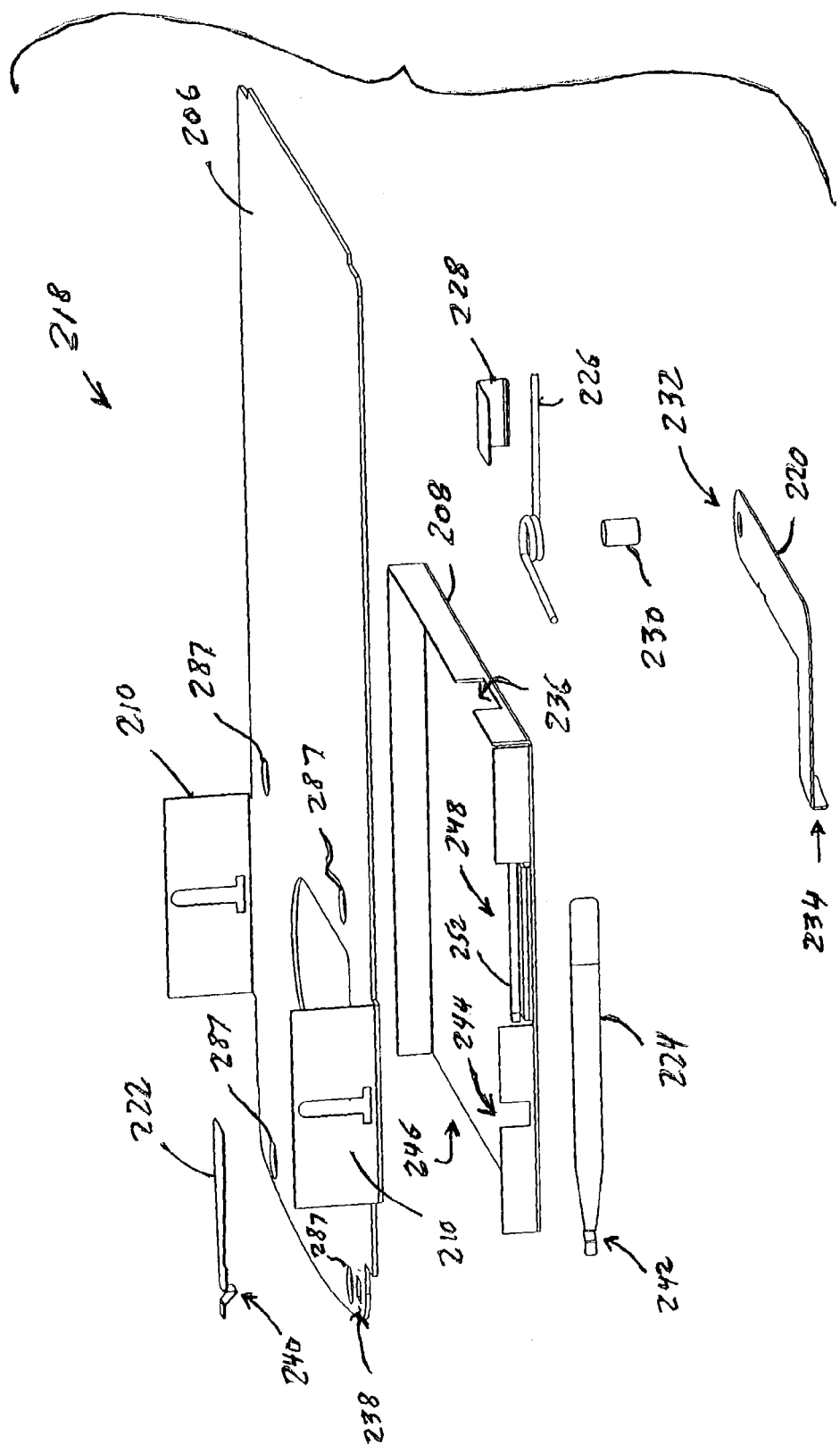
FIG. 5 is an exploded view of the cartridge tray assembly.

FIG. 5 shows an exploded view of cartridge receiver assembly 218. Leaf spring 224 has a barb 242 which projects inward through a rectangular cutout 244 in the side wall of cartridge tray 208 and which engages a rectangular window 140 in shutter 108, visible in FIG. 2. Leaf spring 222 has a barb 240 which projects through a rectangular opening 238 in top cover 206 and engages a notch in the top surface of cartridge 10, i.e., the surface on which shutter 108 is located. Cartridge 10 is inserted into an opening 246 at the end of cartridge tray 208. Also shown in FIG. 5 is spring arm 220, which rotates about a pin 230. Pin 230 is spot-welded to top cover 206. Spring arm 220 is biased by a spring 226, which is compressed between a stop 228, also spot-welded to top cover 206 and a tab 250, shown in FIG. 4B. Spring 226 biases spring arm 220 so that a contact surface 234 extends through an opening 236 in cartridge tray 208 when spring arm 220 is in a relaxed position (i.e., with no cartridge inserted in cartridge tray 208).

Figure 6:
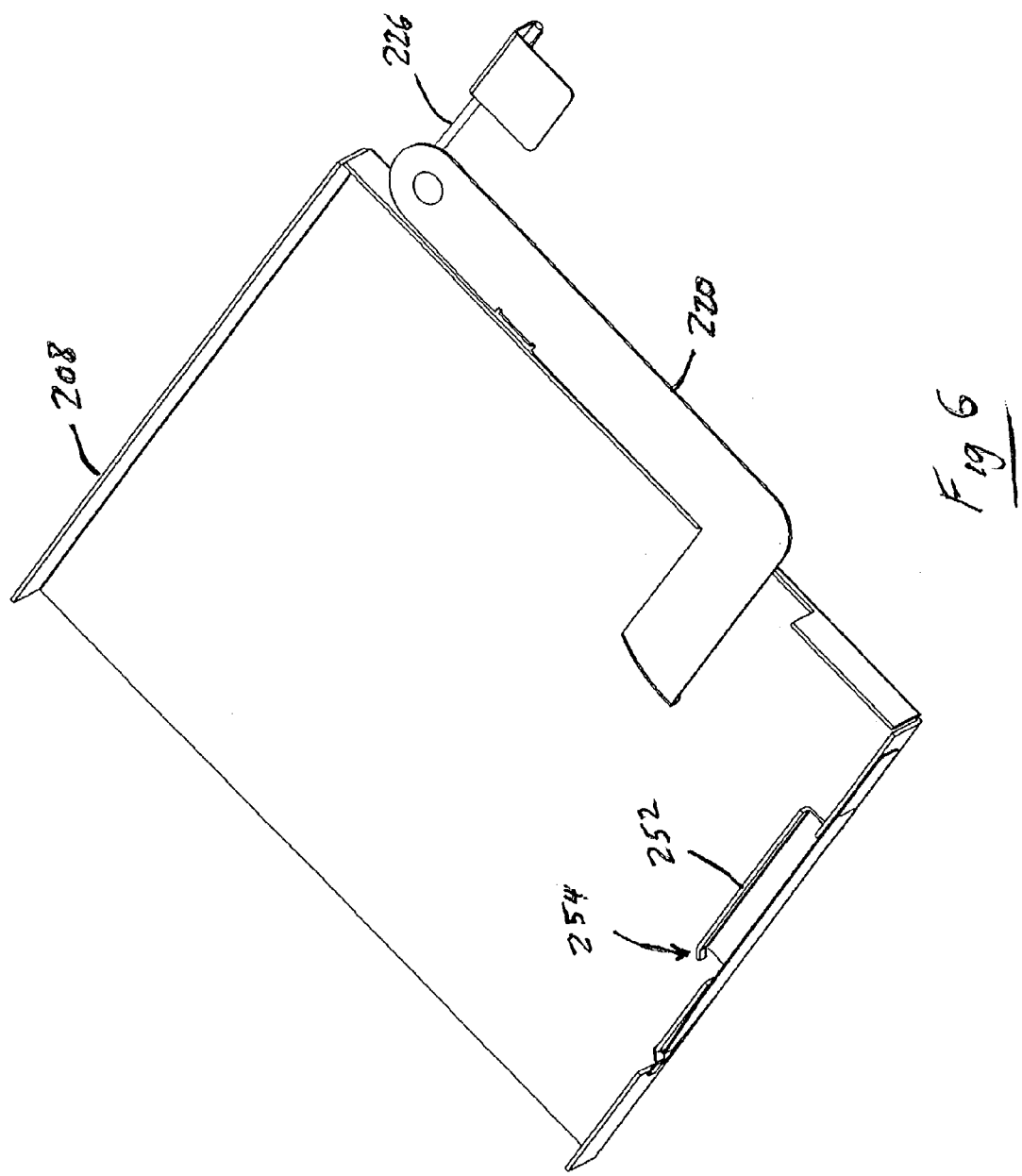
FIG. 6 is a view of the cartridge tray and spring arm.
Figure 7:
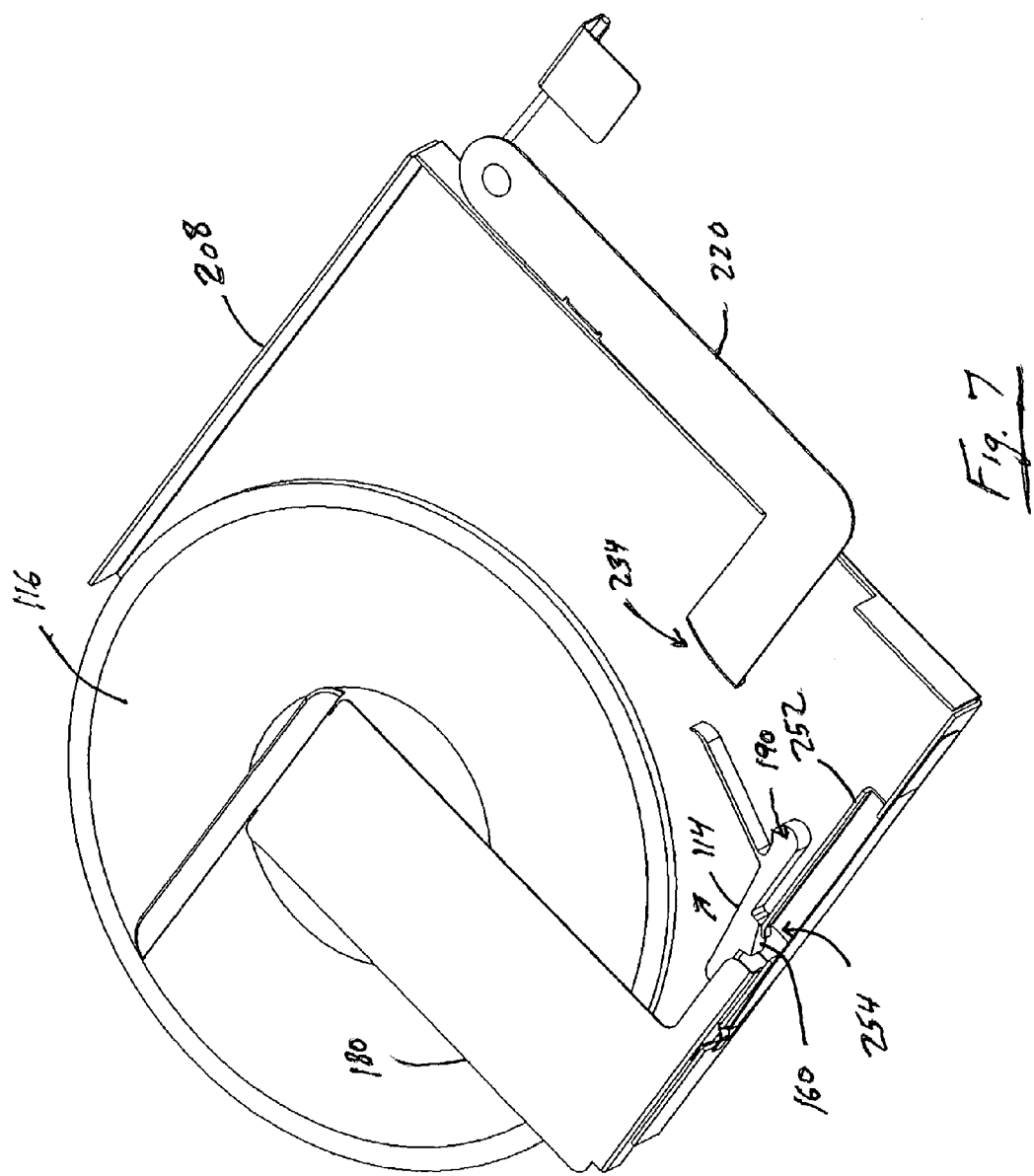
FIG. 7 is a cutaway view of the cartridge inserted in the cartridge tray to the point where the shutter latch begins to disengage.

An opening 248 is formed in a side of cartridge tray 208, and a guide 252 projects inward into the interior of cartridge tray 208. Guide 252, shown more clearly in FIG. 6, performs two functions: First, when cartridge 10 is inserted into cartridge tray 208, a recess on one edge of cartridge 10 rides over guide 252. Thus if the user attempts to insert cartridge 10 improperly, either upside down or trailing edge first, guide 252 will block the insertion. Second, a ramp 254 is formed at one end of guide 252. When cartridge 10 is inserted, ramp 254 slides along an opposing surface of a shutter latch in cartridge 10 so as to release the shutter. FIG. 7 is a view of cartridge 10 with the housing and other elements removed to reveal the positions of a shutter 180 and a shutter latch 114. FIG. 7 shows the position of shutter 180 and shutter latch 114 when cartridge 10 has been inserted to the point of shutter release. As indicated, a surface 160 of latch 114 contacts ramp 254, causing latch 114 to rotate in the direction of the arrow about a pivot axis 190 and disengaging features of shutter 180 and latch 114 which are normally interlocked so as to prevent shutter 180 from sliding open. A disc 116 is also shown in FIG. 7. A complete description of cartridge 10 is provided in the above-referenced application Ser. No. 10/423,097. FIG. 7 shows spring arm 220 in the relaxed position, pressed by spring 226 against the back edge of cartridge tray 208.

Figure 8:
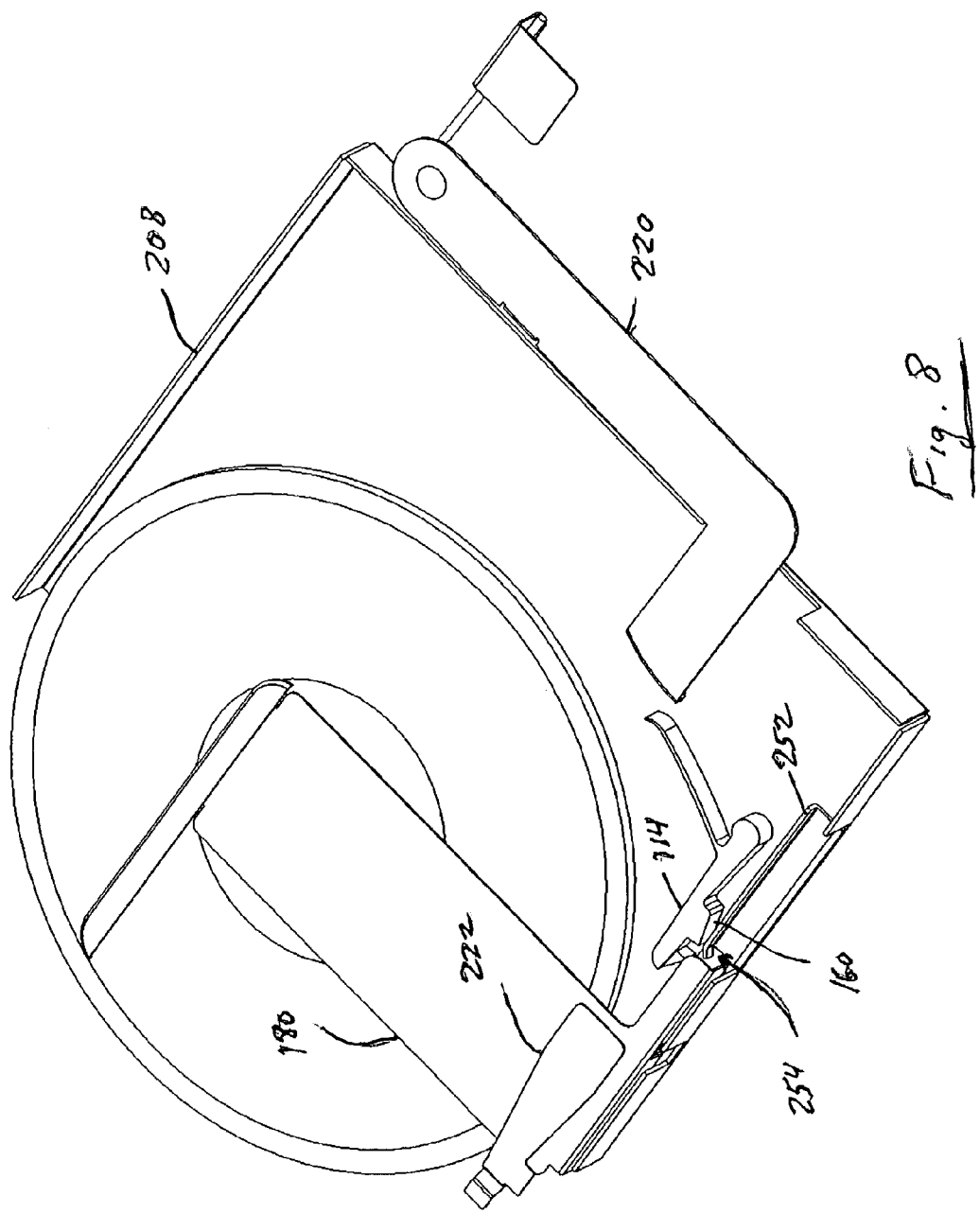
FIG. 8 is a cutaway view of the cartridge and cartridge tray when the cartridge has been inserted slightly beyond the point shown in FIG. 7.
Figure 9:
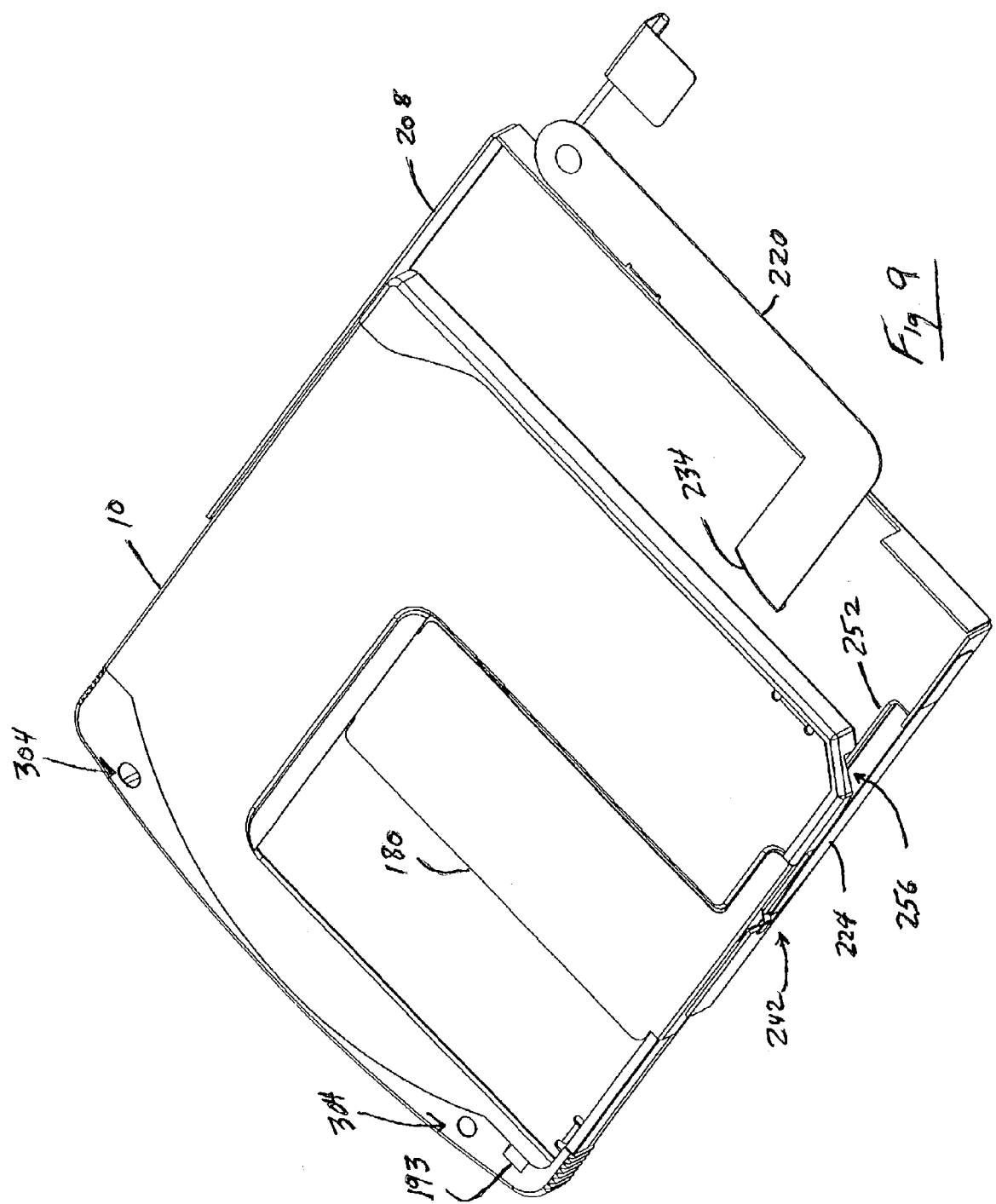
FIG. 9 is a view similar to FIG. 8 except that the housing of the cartridge is shown.
Figure 10:
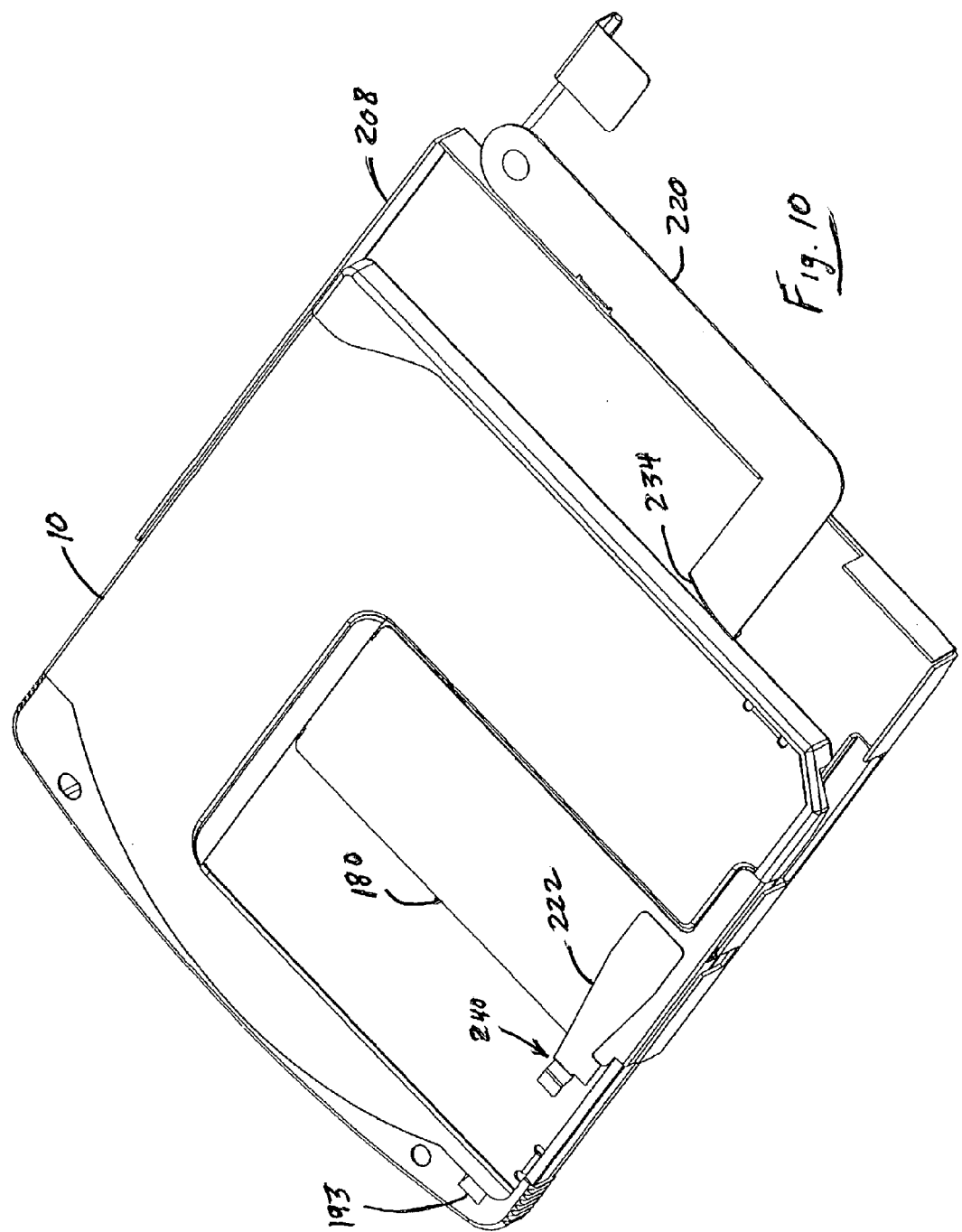
FIG. 10 is a view of the cartridge and cartridge tray when the spring arm has just contacted the leading edge of the cartridge.
Figure 11:
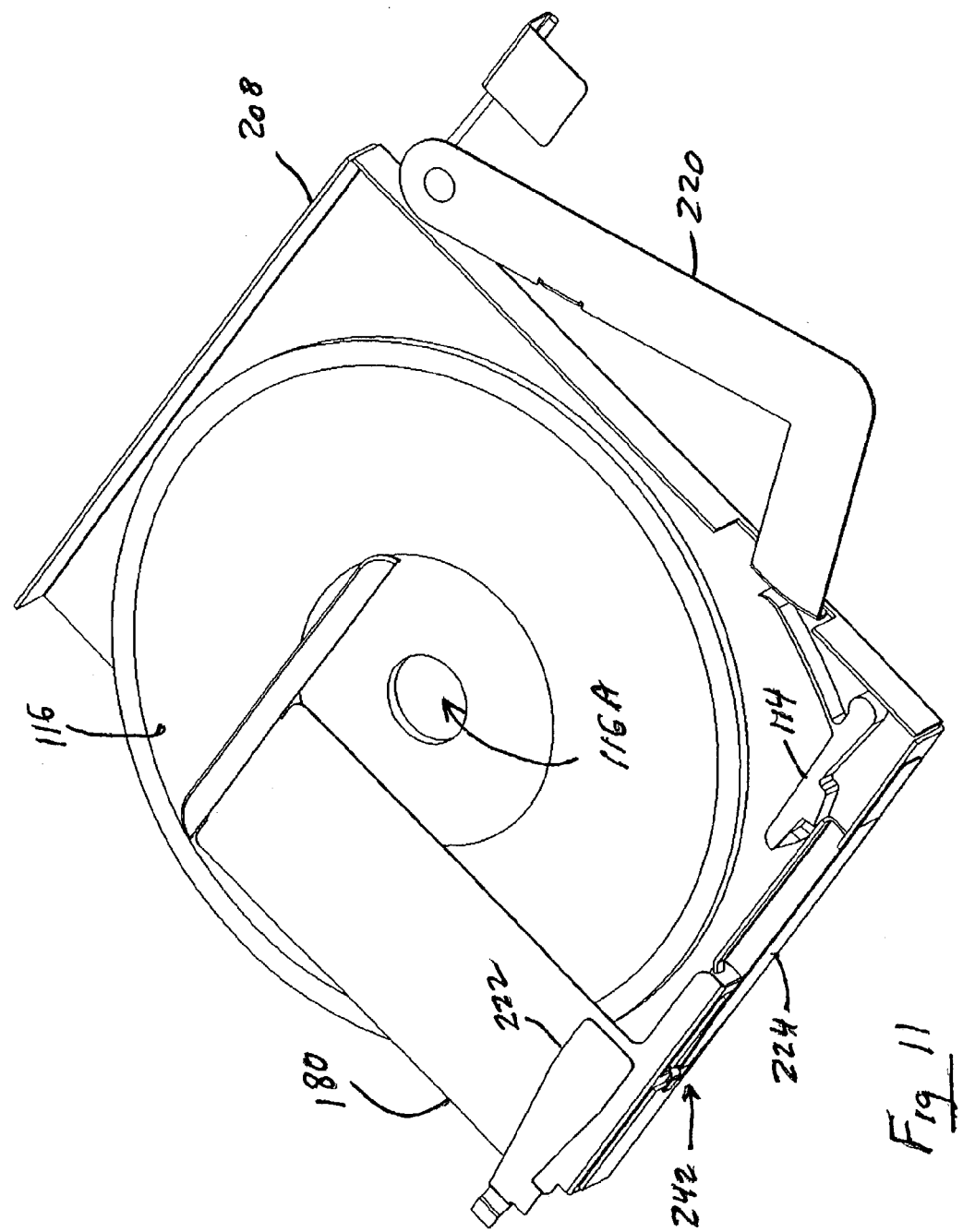
FIGS. 11 and 12 are views of the cartridge and cartridge tray when the cartridge has been fully inserted.
Figure 12:
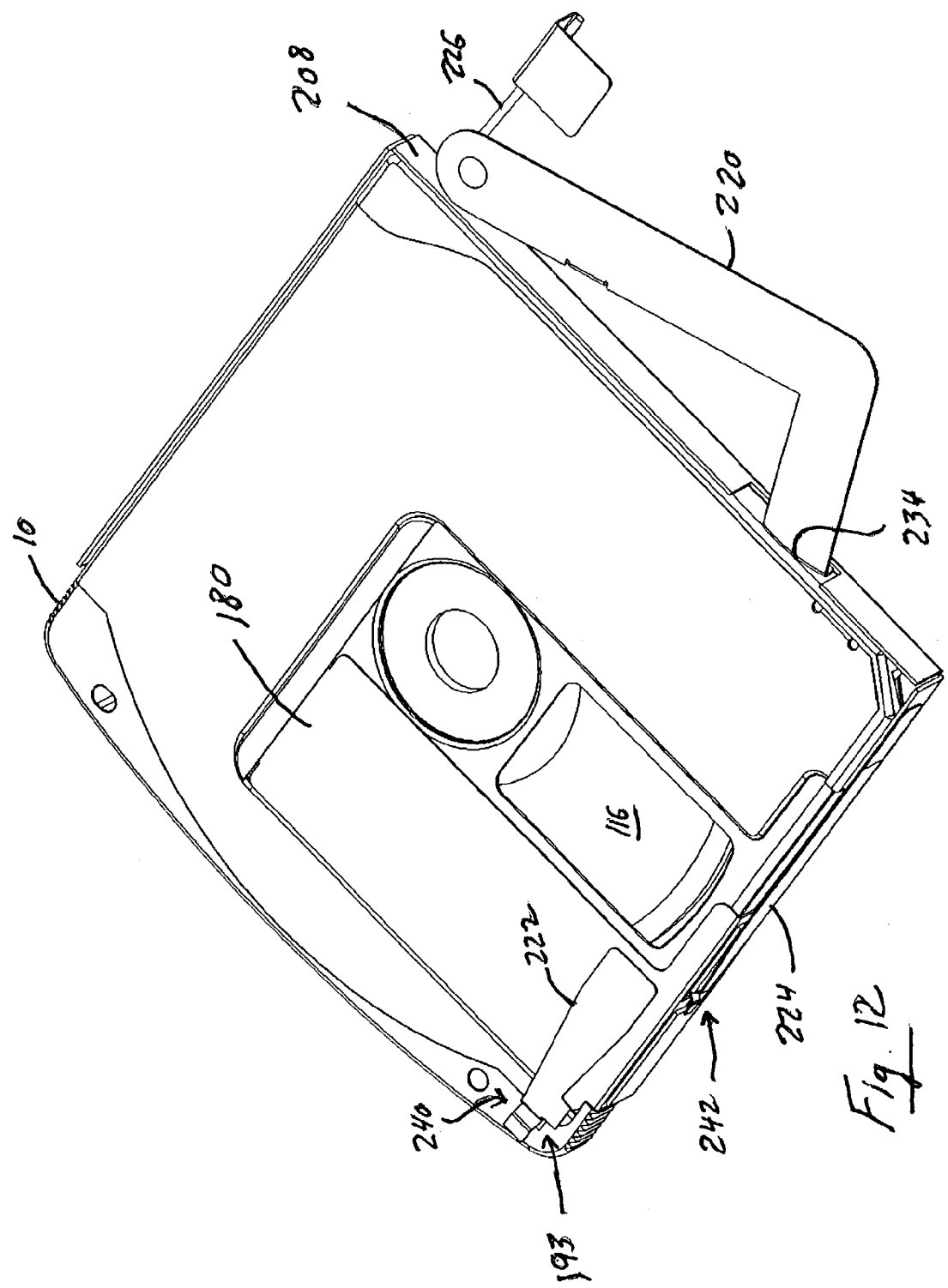
Figure 13:
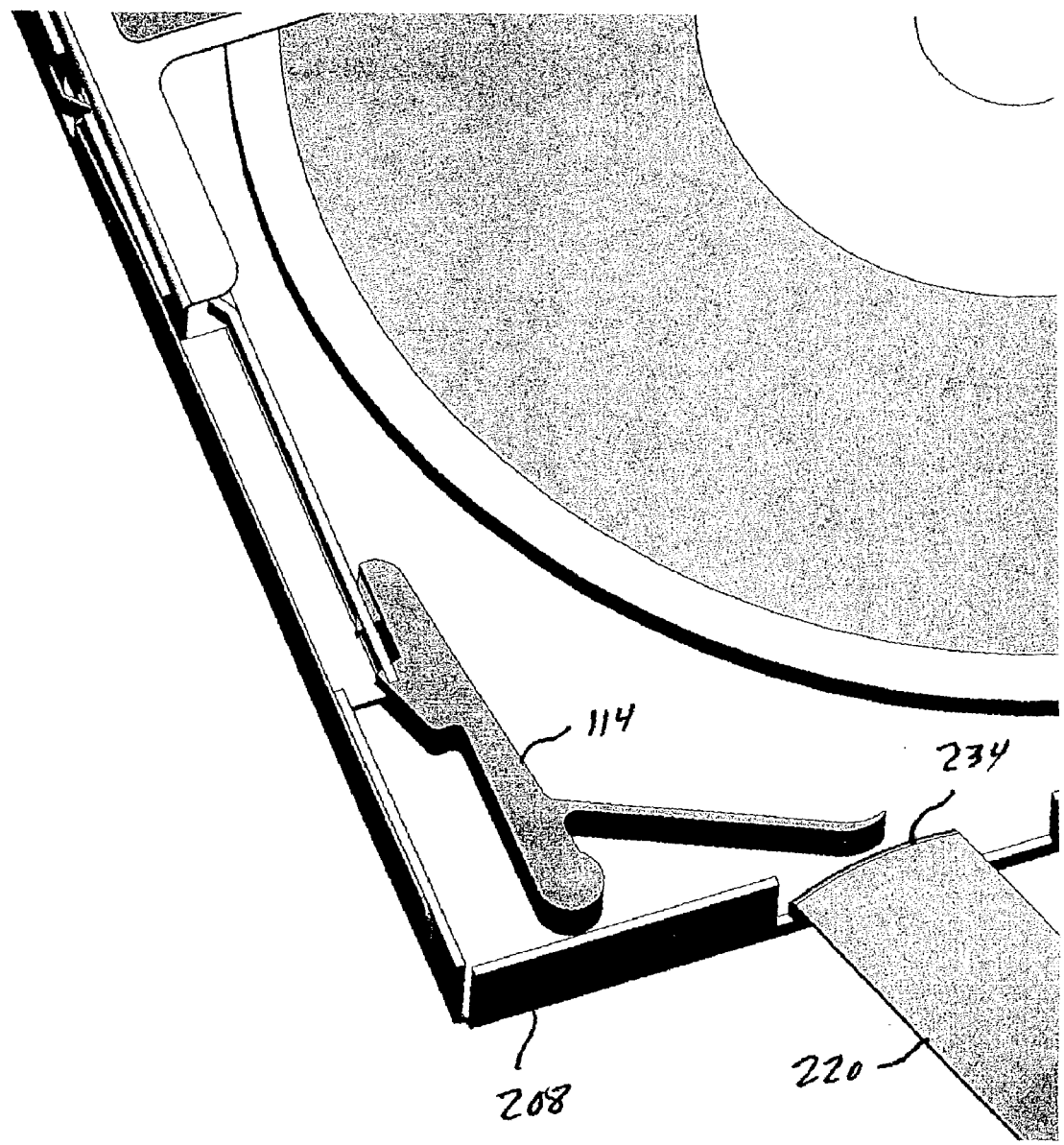
FIG. 13 is a detailed view of the shutter latch when the cartridge has been fully inserted into the cartridge tray.

FIGS. 8–13 show successive positions of shutter latch 114 as cartridge 10 is inserted into cartridge tray 208. FIGS. 8, 11 and 13 are cutaway views similar to FIG. 7, where the housing and other elements of cartridge 10 have been removed to reveal the positions of shutter 180 and shutter latch 114. In FIG. 8, surface 160 of latch 114 has just cleared ramp 254. FIG. 9 is a similar view with the housing of cartridge 10 included, showing in addition a recess 256 of cartridge 10 that rides over guide 252, as described above. Surface 234 of spring arm 220 has not yet contacted the leading edge of cartridge 10. Barb 242 of leaf spring 224 is sliding against a surface of shutter 180 but has not yet become engaged with window 140. Therefore, shutter 180 is still completely closed.

FIG. 10 is similar to FIG. 9 but shows the situation when cartridge 10 has been inserted slightly further to the point where surface 234 of spring arm 220 just contacts the leading edge of cartridge 10. Shutter 180 is still completely closed. It is thus apparent that latch 114 becomes disengaged, freeing shutter 180 to open, before barb 242 of leaf spring 224 engages window 140 of shutter 180 and begins to pull shutter 180 open. In one embodiment, cartridge travels approximately 1.2 mm between the time at which latch 114 becomes disengaged and the time at which shutter 180 begins to open. FIG. 10 also shows leaf spring 222 and barb 240, as well as a recess 193 in cartridge 10, which will become engaged with barb 240 when cartridge 10 is fully inserted into cartridge tray 208.

FIGS. 11–13 show the state of affairs when cartridge 10 has been fully inserted into cartridge tray 208. Surface 234 of spring arm 220 is pressed against the leading edge of cartridge 10 and has been rotated against the force of spring 226. Barb 242 of leaf spring 224 has engaged window 140 of shutter 180 and pulled shutter 180 open, exposing the data area and a central hole 116A of disc 116. As shown in FIG. 12, barb 240 of leaf spring 222 is lodged in recess 193 of cartridge 10, holding cartridge 10 securely in cartridge tray 208.

Body Assembly

Figure 14:
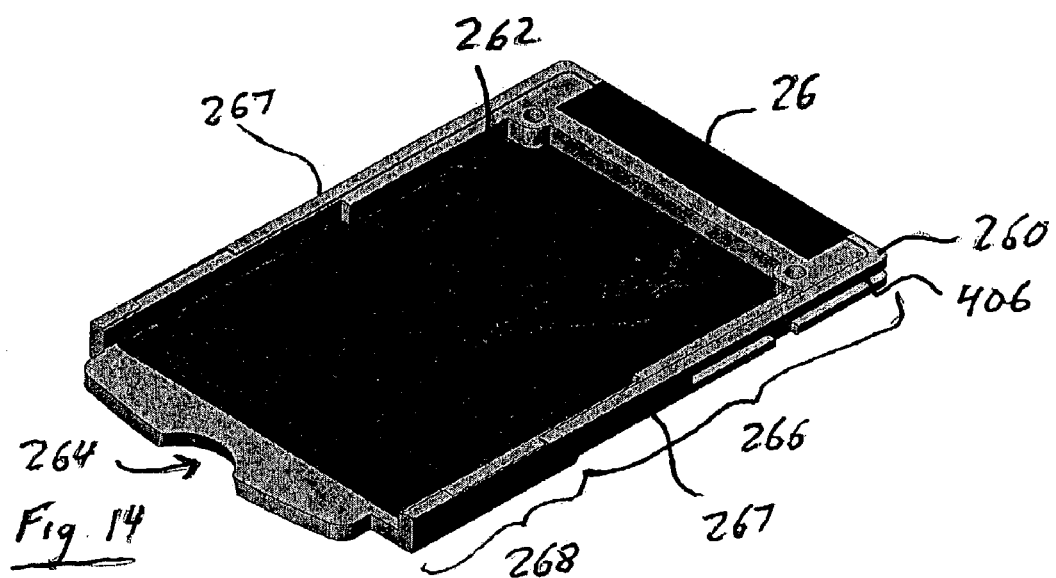
FIG. 14 is a view of a portion of the body assembly.

Disc drive 20 includes two basic components, body assembly 24 and drive mechanism 22. FIG. 14 shows a portion of the body assembly 24, which includes a standard connector 26, which in this embodiment is a 50-pin CompactFlash connector, a lower housing 260 and a printed circuit board assembly (PCBA) 262, with the required integrated and discrete circuitry. In the embodiment shown, PCBA 262 essentially runs the length of body assembly 24. The rounded notch 264 in the forward edge of lower housing 260 is to make full insertion of the cartridge easier. Lower housing 260 has a first portion 266, which is generally sized and shaped to fit into a CompactFlash slot, and a second portion 268, which is not necessarily designed to fit into a CompactFlash slot. The lateral edges 267 of lower housing 260 function as integral rails that slide along the side walls of a CompactFlash slot as disc drive 20 in being inserted into the slot.

Figure 15:
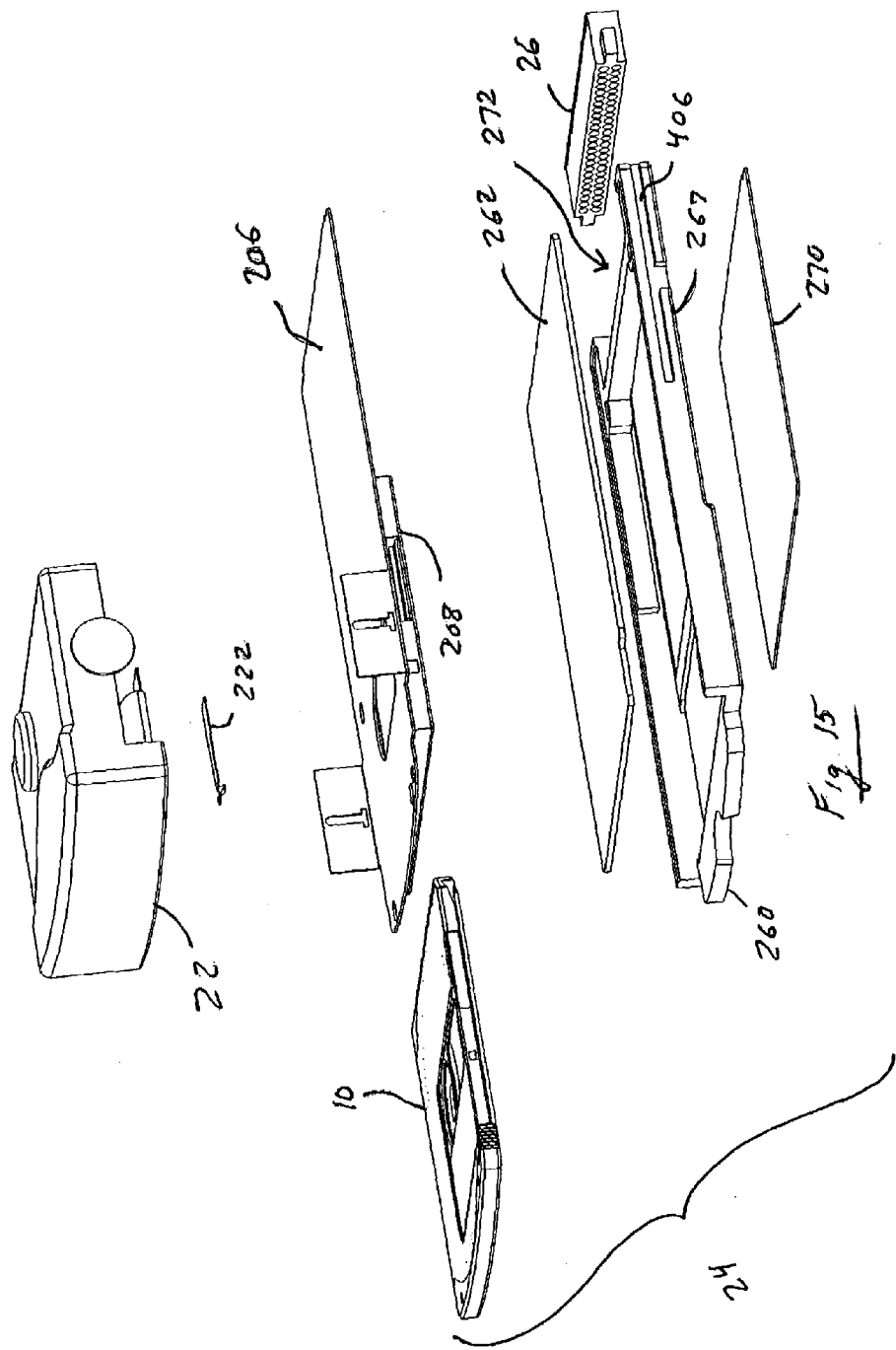
FIG. 15 is an exploded view showing major components of the body assembly.

FIG. 15 is an exploded view showing major components of body assembly 24. Included are top cover 206, cartridge tray 208 (attached to the underside of top cover 206), PCBA 262, housing 260, connector 26, a bottom cover 270, and barbed spring 222. Connector 26 fits into a recess 272 in housing 260 and is attached with an adhesive. Like top cover 206, bottom cover 270 is preferably made of sheet metal. Also shown in FIG. 15 is drive mechanism 22.

Figure 16:
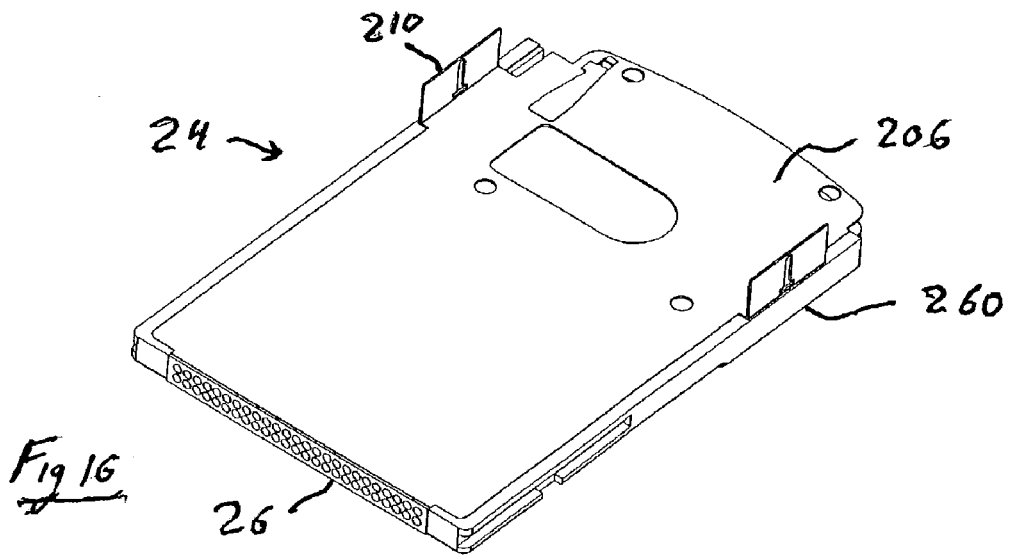
FIG. 16 is view of the body assembly.

FIG. 16 shows body assembly 24 assembled, with top cover 206 attached to lower housing 260. Top cover 206 may be attached to lower housing 260 by an adhesive or threaded fasteners or by the welding of tabs between top cover 206 and bottom cover 270. As will be apparent, cartridge 20 is off-center in disc drive 20 to accommodate the passage of circuitry to drive mechanism 22 and to allow full travel of the optomechanical carriage assembly in drive mechanism 22 (described below) over the data band on the disc 116.

FIG. 17 is a cross-sectional view of disc drive 20, taken at section line 17—17 shown in FIG. 1. As indicated, the horizontal dimension X2 of drive mechanism 22 substantially coincides with the width of the second portion 268 of body assembly 24. As noted above, the dimension X1 is approximately 40 mm. The thickness Z1 of the first portion 266 of lower housing 260 is 3.3 mm, and this dimension increases by approximately 0.7 mm in the thicker portion 268. Thus, in this embodiment the second portion 268 of body assembly 24 is about 4 mm thick, slightly thicker than the first portion 266 of body assembly 24. This allows additional space for internal components of disc drive 20. The overall height Z2 of the drive in the area of drive mechanism 22 is 10.5 mm.

When disc drive 20 is fully inserted into a CompactFlash® slot, the entrance to the slot is located near the line of intersection of first portion 266 and second portion 268 (see FIG. 37). Thus cartridge 10 and particularly disc 116 would protrude into the CompactFlash® slot. This limits the protrusion or "overhang" of disc drive 20 from the PDA or other device in which the slot is formed. Also shown in FIG. 17 are the positions of top cover 206, PCBA 262 and bottom cover 270.

The foregoing is shown graphically in FIGS. 36 and 37. FIG. 36 shows disc drive 20 inserted into a PDA 30, and FIG. 37 is a cross-sectional view of disc drive 20 and PDA 30 taken at line 37—37 shown in FIG. 36. As shown, disc drive 20 is inserted into a memory card slot 32 in PDA 30, preferably a slot that is designed to receive a Type I CompactFlash® card. Substantially all of the first portion 266 of body assembly 24 is positioned inside slot 32, except for a small region 269 which lies adjacent the gap between drive mechanism 20 and the face of PDA 30. First portion 266 fits within, and is in all respects structurally and electrically compatible with, slot 32. For example, socket connector 26 in disc drive 20 mates with a corresponding CompactFlash pin connector 34 located at an internal end of slot 32. Integral rails 267 of lower housing 260 conform with the sides of slot 32. As shown in FIG. 38, which is a view of PDA 30 without disc drive 20, a rib 404 lines each side of slot 32. Ribs 404 mesh with grooves 406 on rails 267 of lower housing 260, as shown in FIGS. 14 and 15.

Moreover, it is evident from FIG. 37 that a portion of cartridge 10, a portion of cartridge tray 208, and a portion of disc 116 extend into slot 32. This allows drive mechanism 22 to be made narrower and limits the distance by which disc drive 20 protrudes from slot 32 (i.e., the "overhang").

Drive Mechanism

Drive mechanism or "pod" 22 includes the following components:

1. An optomechanical carriage, which contains the laser, detectors, optics and fine servo motors for focus and fine tracking as well as the electronic circuitry needed for servo and data detection functions.

2. An upper PCBA (smaller than PCBA 262 in body assembly 24) for terminating the interconnects and circuitry to support the spindle, servo and data detection.

3. Flexible circuitry and designed service loops for communication with other electronics and to allow carriage movement, vertical pod movement, and installation of these components and the carriage drive (coarse tracking) motor.

4. A coarse servo mechanism, operated by a lead screw or linear motor to move the optomechanical carriage to the desired point in the databand.

5. A spindle and spindle drive motor assembly.

6. A latch mechanism for holding the drive mechanism in engagement to the media, or releasing it, and release buttons.

7. A load button, which provides overtravel of the spindle to engage the media.

8. A lift spring and cup to elevate the drive mechanism for cartridge insertion.

9. A housing and cover.

Figure 18:
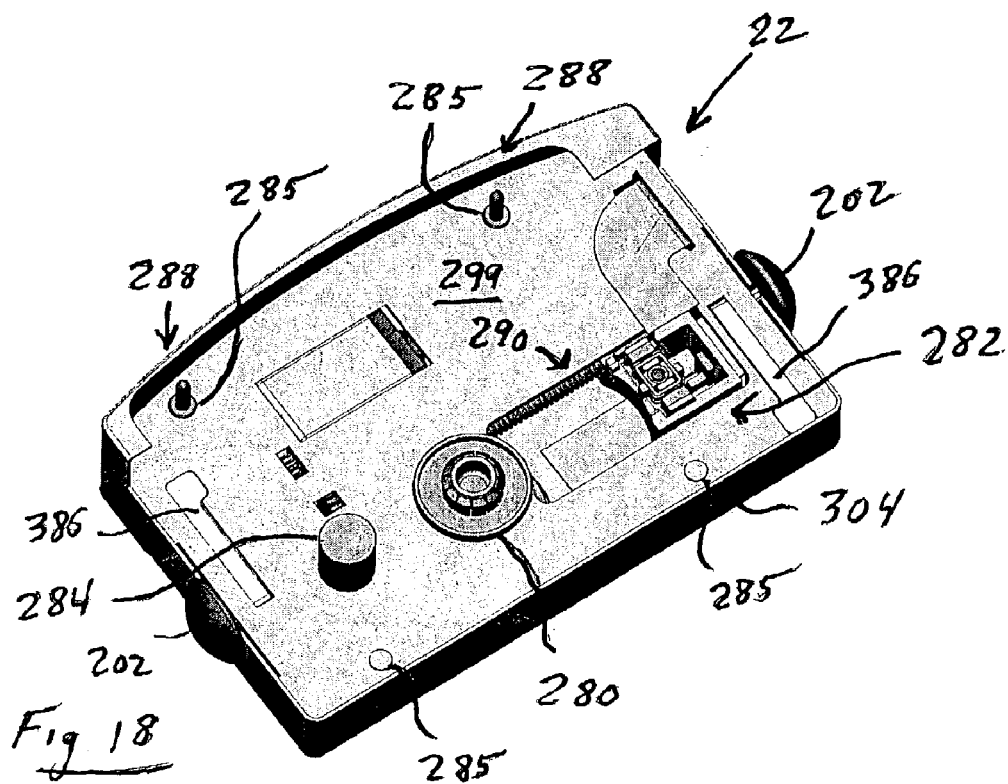
FIG. 18 is a view of the drive mechanism from the bottom.
Figure 19:
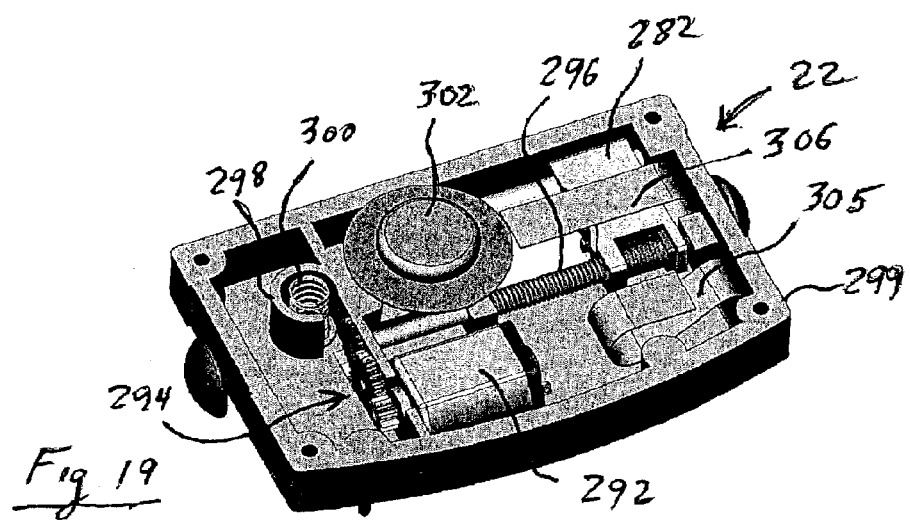
FIG. 19 is a view of the drive mechanism from the top with the cover piece and upper PCBA removed.

FIG. 18 is a view of drive mechanism 22 from the bottom and FIG. 19 is a view of drive mechanism 22 from the top with a cover piece 310 and PCBA 308 removed. Referring to FIG. 18, drive mechanism 22 contains a spindle assembly 280, a data access opening 290 and an optomechanical carriage assembly 282. Spindle assembly 280 engages a central hole in disc 116. As described below, optomechanical carriage assembly 282 contains a laser, a lens and other components for reading data from an optical data storage disc through data access opening 290. As shown, spindle assembly 280 is located off center of drive mechanism to allow room for electrical connections between body assembly 24 and drive mechanism 22 and to facilitate the reading of the data area of a disc.

Also shown in FIG. 18 are a spring-loaded cup 284, which biases drive mechanism 22 in a raised position, allowing the insertion of a disc through opening 246 (FIG. 5) when drive mechanism 22 is not latched to body assembly 24. Spring-loaded cup 284 abuts against the external surface of top cover 206 of body assembly 24. Cartridge 10 is located precisely to drive mechanism 22 by cartridge locating pins 288, also shown in FIG. 18, which fit into corresponding holes 304 in cartridge 10 (see FIG. 9). Pins 288 are "bullet nose" pins. The radius cut onto the flanks of the insertion point is equal to the diameter of the pin. This shape offers a maximum acquisition zone for insertion into a hole 304 and a minimum opportunity for binding or balking on insertion. Also shown in FIG. 18 are auxiliary datum pads 285 which locate cartridge 10 in the proper orientation with respect to spindle assembly 280. As indicated, two of the datum pads 285 are located at the bases of locating pins 288. When a cartridge 10 has been inserted and drive mechanism 22 has been closed, locating pins 288 and datum pads 285 project through openings 287 in lower housing 260 to make contact with the surface of cartridge 10.

Referring now to FIG. 19, the top surface of optomechanical carriage assembly 282 is shown, along with a lead screw 296 (partially visible in FIG. 18) that is used to provide coarse positioning for the read/write laser beam that emanates from optomechanical carriage assembly 282. Lead screw 296 is driven by a carriage drive (coarse tracking) motor 292 through a two-stage gear reduction unit 294. Anti-backlash gears may be used in the drive train. The bearing elements for lead screw 296 preferably contain at least one pre-loaded pair of ball bearings to keep friction low, but eliminate backlash in the motion of lead screw 296 along its axis of rotation.

A load button 302 is pressed by the user after a cartridge has been inserted into disc drive 20, opposing the force of spring-biased cup 284, causing drive mechanism 22 to become latched to body assembly 24, and advancing an expandable collet into the central hole of optical disc 116. A flexible interconnect 305 connects PCBA 262 in body assembly 24 to a PCBA 308 in drive mechanism 22, and a flexible interconnect 306 connects the PCBA 308 in drive mechanism 22 to optomechanical carriage assembly 282. PCBA is removed from the view in FIG. 19 but is visible in the cross-sectional view of FIG. 21.) In general, the components of drive mechanism 22 are mounted in a body member 299, which can be made of a metal such as aluminum or magnesium or a plastic resin such as a liquid crystal polymer having a Young's modulus of at least $2.8 \times 10^4$ MPa ($4.4 \times 10^6$ psi). A lift spring 300 which presses again cup 284 is enclosed in a cylindrical compartment 298 formed in body member 299.

Figure 20A:
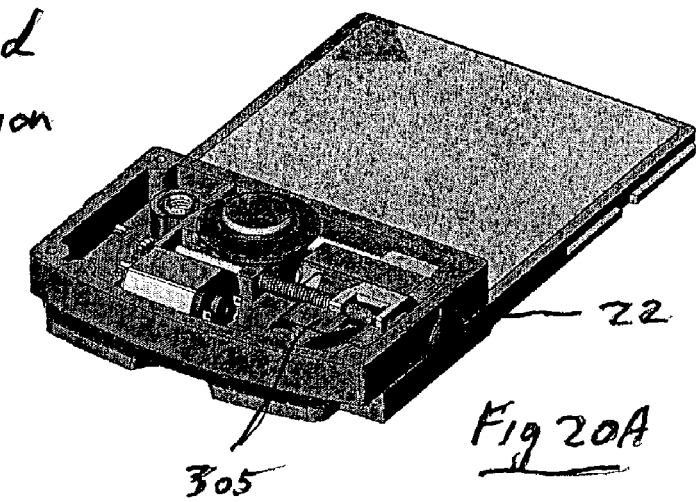
FIGS. 20A and 20B show the closed and open positions of the drive mechanism, respectively.
Figure 20B:
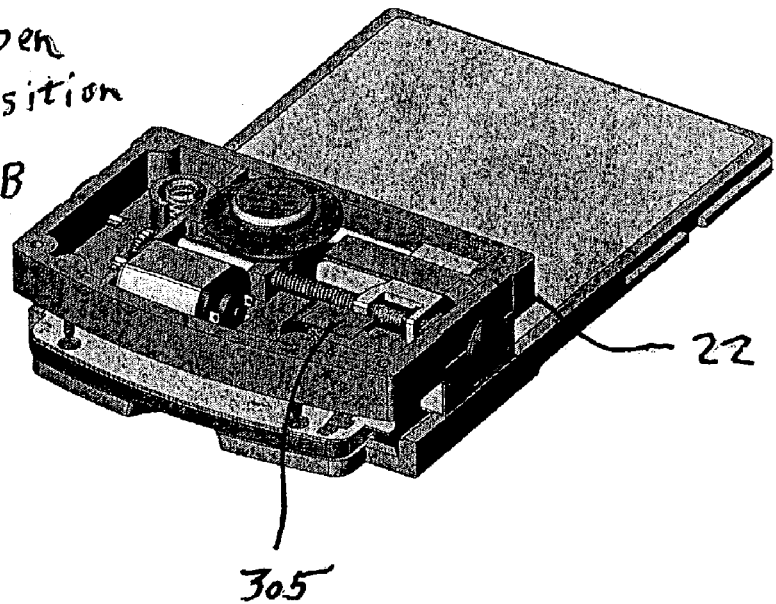

Inside drive mechanism 22, flexible interconnect 305 has a serpentine service loop which is designed to allow flexible interconnect 305 to retract smoothly into drive mechanism 22 as the assembly is closed for operation. ZIF connectors on either or both of PCBAs 262 and 308 may be used to facilitate assembly. FIGS. 20A and 20B show how the configuration of flexible interconnect 305 changes between the open and closed positions of drive mechanism 22. From FIG. 17, it is clear that drive mechanism 22 is adjacent second the portion 268 of body assembly 24 when drive mechanism 22 is in the closed position.

To service the motion of optomechanical carriage assembly 282 along the tracking path, flexible interconnect 306 forms a single loop between the tail of carriage assembly 282 and PCBA 308. The carriage end of this flexible interconnect 306 circuit is connected to a laser/detector package for signal and data transfer, and to a fine servo motor to control focus and tracking. In an implementation using a linear motor, it would also carry the coarse motor current. Again, a ZIF connector on the PCBA 308 can be used to facilitate assembly.

A short flexible interconnect (not shown) may be used to connect coarse tracking motor 292 to PCBA 308, although discrete wires or formed motor terminals could also be used.

Figure 21:
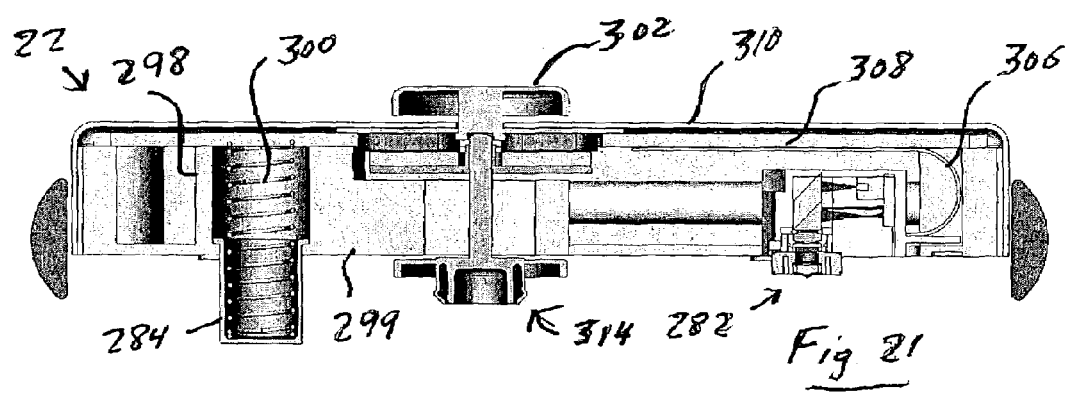
FIG. 21 is a cross-sectional view of the drive mechanism.

FIG. 21 is a cross-sectional view of drive mechanism 22 which shows a PCBA 308 adjacent to a cover piece 310. Flexible interconnect 306 is shown extending from PCBA 308 to optomechanical carriage assembly 282. Also shown are spring cup 284 and lift spring 300, the upper end of which abuts against the lower surface of PCBA 308. Spring cup 284 is shown extended from body member 299, in its position when drive mechanism 22 is not latched to body assembly 24. Load button 302 moves spindle assembly 280 vertically through the stator plate which is directly beneath load button 302.

Figure 22:
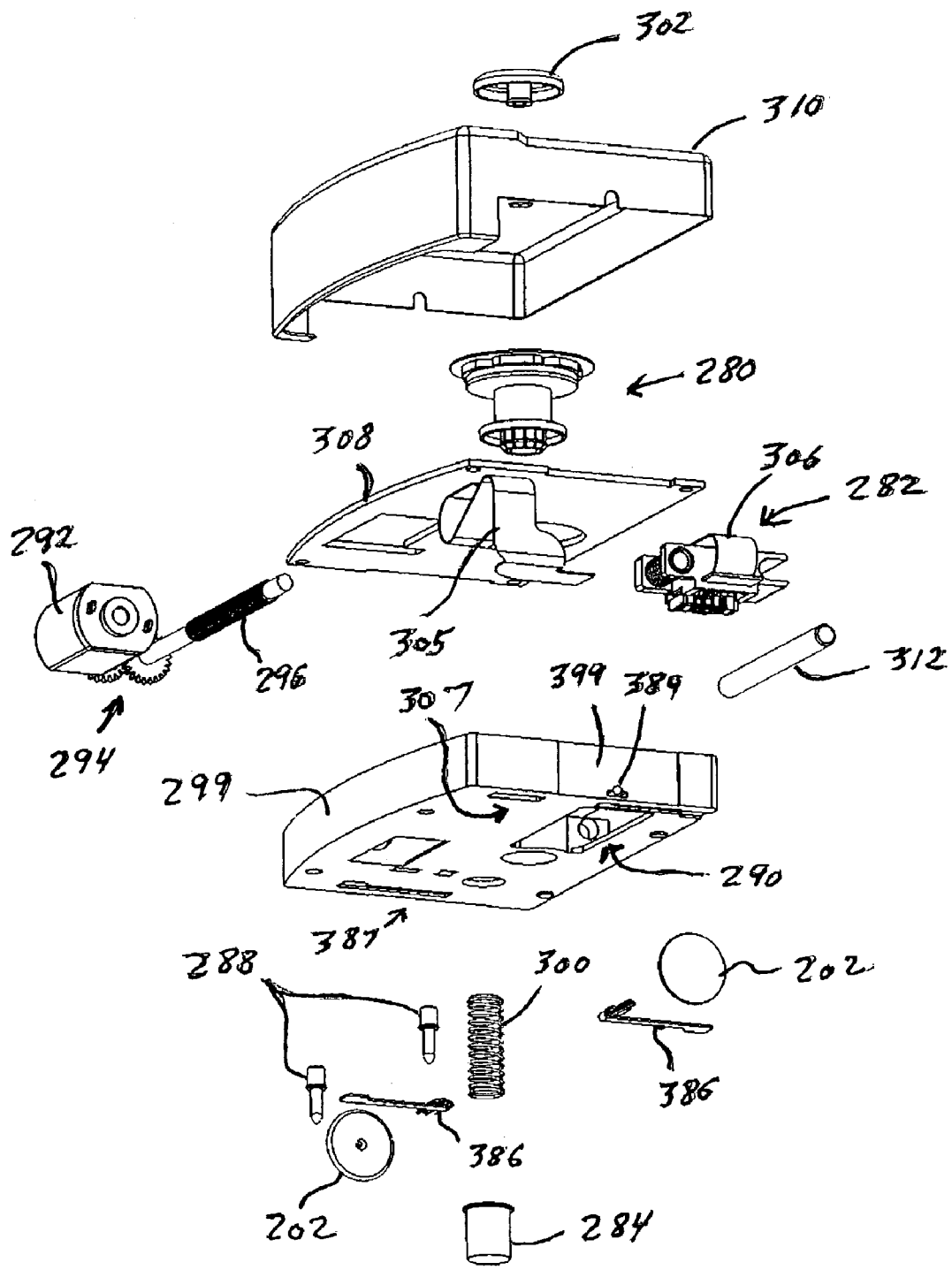
FIG. 22 is an exploded view of the drive mechanism.

FIG. 22 is an exploded view of drive mechanism 22, showing the components described above. Also shown is a rail 312 along which optomechanical carriage assembly 282 slides and a slot 307 in body member 299 through which flexible interconnect 305 extends between PCBA 308 in drive mechanism 22 and PCBA 262 in body assembly 24 Also, recesses 399 are formed in the side walls of body member 299. Guides 210 slide in recesses 399 as drive mechanism 22 is opened and closed, preventing drive mechanism 22 from rocking when it is in the open position.

Coarse Tracking Mechanism

Figure 23:
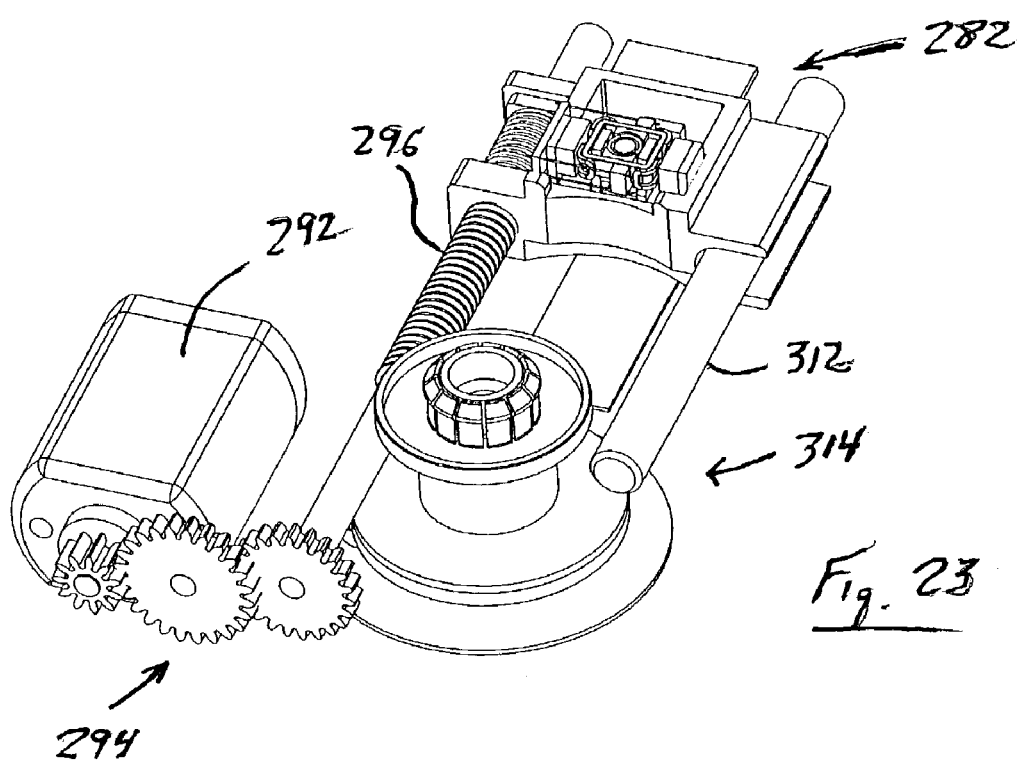
FIG. 23 is a view of the coarse tracking mechanism and spindle motor assembly.

The coarse tracking mechanism and spindle motor assembly 314 are shown in FIG. 23. Coarse tracking motor 292 is a brush-type, reversible DC motor, such as a Canon model DN06-V*N*B, although a stepper motor or brushless DC motor could also be used. Among the factors that determine the choice of motor are bandwidth, power consumption, cost, reliability and durability.

Lead screw 296 and optomechanical carriage assembly 282 may be coated with or made from materials which mitigate the friction inherent in this type of actuator. Materials such as polytetrafluoroethylene (PTFE) or molybdenum disulfide can be used as a coating for threaded elements, and added to molding resins to optimize the tribology between lead screw and nut of such a driver. This can also reduce power consumption and improve servo response.

Coarse tracking motor 292 moves in response to a signal derived from a position sensor on the fine tracking motor (described below). The fine tracking motor follows the tracks on an optical disc, including disk runout, and accomplishes small seek movements. However, when the fine tracking motor is away from its center position by a specified average amount, lead screw 296 will be turned to advance or retract the optomechanical carriage assembly 282 to a position near the center of the fine tracking motor travel. The two-stage spur gear reduction unit 294 allows the use of a small, low current motor. Other gear reduction schemes could also be used, but spur gears are low cost and high efficiency. The gears in gear reduction unit 294 correspond roughly to 120 diametral pitch gears, but they could also be special pitch or metric module gears. The gear reduction unit may also contain anti-backlash gears.

Spindle Motor Assembly

Figure 24A:
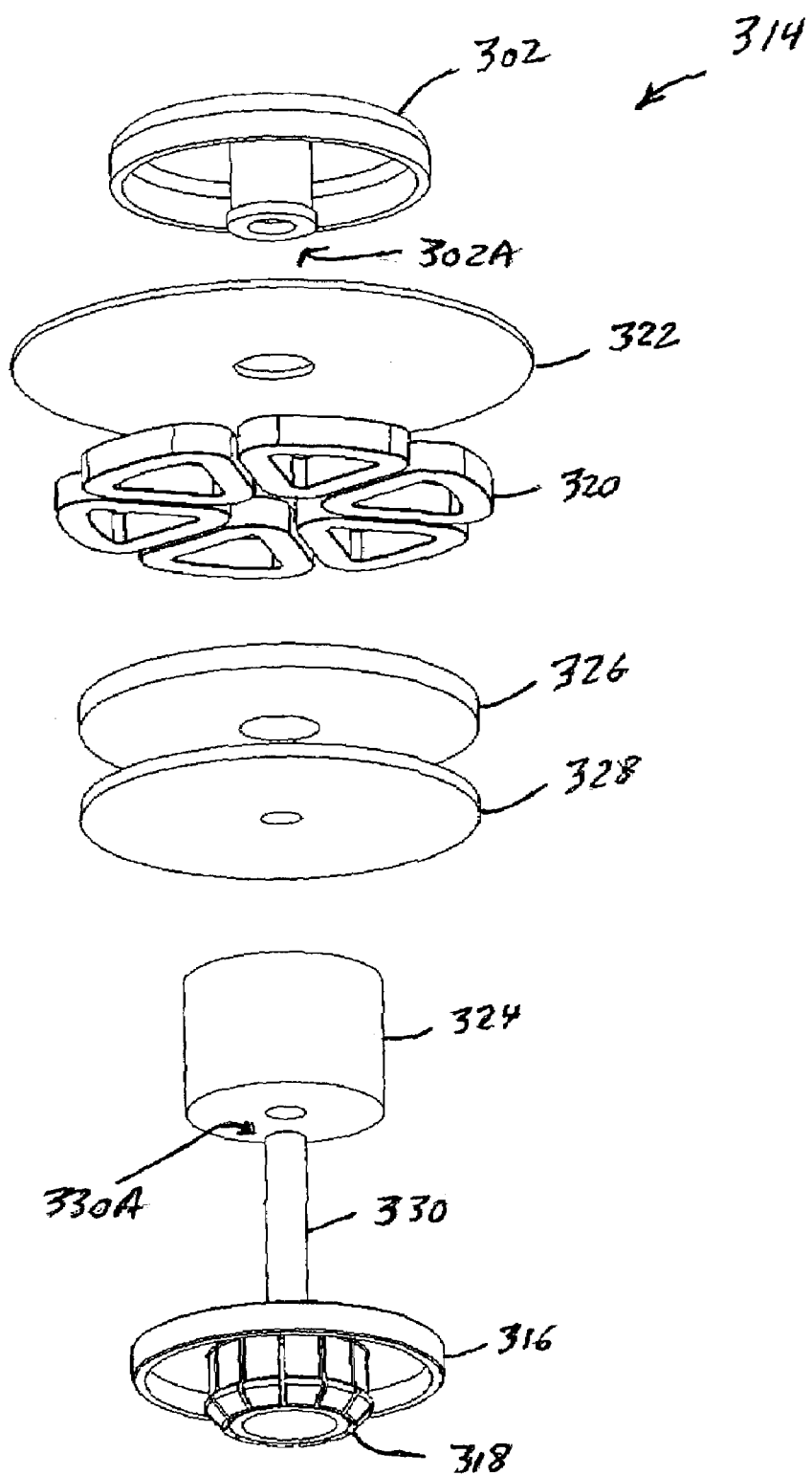
FIG. 24A is an exploded view of the spindle motor assembly.

FIG. 24A is an exploded view of spindle motor assembly 314, including a spindle shaft 330, a disk platen 316, an expandable collet 318 for disk retention, a spindle rotor magnet 326 and backing plate 328, a spindle bearing/bushing 324, stator coils 320 and stator plate 322, and load button 302. These parts are also shown (unnumbered) in FIG. 21.

Stator coils 320 and stator plate 322 are located just below load button 302, and are both glued to upper PCBA 308. Load button 302 is preloaded by the attraction of spindle rotor magnet 326 to stator plate 322. Optionally, a spring element (not shown) may also be interposed between load button 302 and cover piece 310. Spindle bearing/bushing is a precision bushing which allows spindle shaft 330 to rotate and to slide in an axial direction. Load button 302 has a hardened face 302A which acts as a thrust bearing for a hardened, radiused end 330A of the spindle shaft 330. When pushed downward, load button 302 advances disk platen 316 and collet 318 to seat a disk on platen 316 while resting in the cartridge. With shutter 180 in the open position, expandable collet 318 projects into the central hole 116A of disc 116 (see FIG. 4C). The spindle rotating elements (i.e., rotor magnet 326, backing plate 328, shaft 300, platen 316 and collet 318) then retract to the run position when the load button 302 is released.

Stator coils 320 are a standard brushless multi-phase drive for spindle rotor magnet 326, which is magnetized in "pie-slice" shaped segments through its thickness in the axial direction. The north-south orientation of the magnetic material is in the same direction. The magnetic material is preferably a barium ferrite ceramic, but it could be any of several others, including a rare-earth composite or hard magnetic material, such as neodymium-iron-boron, samarium cobalt, etc.

Clamping the disk with an expandable collet and platen, as described above, obviates the need to provide the disc with a magnetic hub. This is desirable for reasons of cost, reliability, and size. The clamping mechanism must be positive, which can be prohibitively complex for media-in-cartridge. Using the force available through the manual latching/loading of the system by the operator allows this to be done without consuming battery power, or providing complex load mechanisms. As described in the above-referenced application Ser. No. 10/423,097, a raised ring can be provided on the "label" (downward facing) side of the cartridge to hold the disc away from the cartridge bottom wall, but the position at which the disc rests is still more than 300 micrometers away from the run position of the disc. That means that the spindle must be momentarily advanced to a clamping position, and then retracted to the run position. A plain spindle bearing/bushing 324 for spindle shaft 330, and load button 302, which acts as a magnetically loaded thrust bearing, allow this to happen.

FIG. 24B shows a detailed view of platen 316 and collet 318. Collet 318 includes a plurality of flexible fingers 317 arrayed circumferentially around a central hub 319. Platen 316 and collet 318 are preferably made of plastic resin having a Young's modulus of $2.8 \times 10^4$ MPa ($4.4 \times 10^6$ psi) or higher with an admixture of PTFE. Selection of the material involves compromises between surface hardness, wear resistance, low friction, stiffness (high Young's modulus), and resistance to creep. One possibility would be a nylon 6 resin containing approximately 5% PTFE and 20% short glass fiber reinforcement.

As collet 318 is lowered into the central hole 116A of disc 116, the canted leading surfaces 317A of fingers 317 slide along the edges of hole 116A until disc 116 is captured by the trailing surfaces 317B. During this process, disc 116 is pressed against the raised ring on the interior of the bottom wall of the cartridge, the raised ring holding disc 116 sufficiently far above from the bottom wall of the cartridge to allow the bottom surface of disc 116 to clear the "peak" of each finger 317. This distance is shown as Z3 in FIG. 24B. In the embodiment shown, canted leading and trailing surfaces 317A and 317B are angled at 45° with respect to vertical. Since disc 116 is typically very light, only a small force is required to hold disc 116 firmly against platen 316.

This process is reversed when collet 318 is withdrawn from disc 116. A similar raised ring on the upper surface of cartridge 10 prevents the data are of disc 116 from coming into contact with the interior surface of the cartridge.

FIG. 39 shows a cross-sectional view of disc 116 inside cartridge 10, showing raised rings that are used to prevent the disc from being pressed flat against the top and bottom walls of the cartridge when collet 318 is being inserted and withdrawn. Cartridge 10 has a sheet metal top wall 104T and a sheet metal bottom wall 104B. The sheet metal is stamped to form a raised ring 400 in bottom wall 104B and a raised ring 402 in top wall 104T. The number 192 identifies a paper label that is affixed to the outside of bottom wall 104B. To allow collet 318 to project sufficiently into the central hole of disc 116 to trap disc 116 on the trailing surfaces 317B, the height Z4 of raised ring 400 must be at least equal to the distance Z3 in FIG. 24B.

Carriage Assembly

Figure 25:
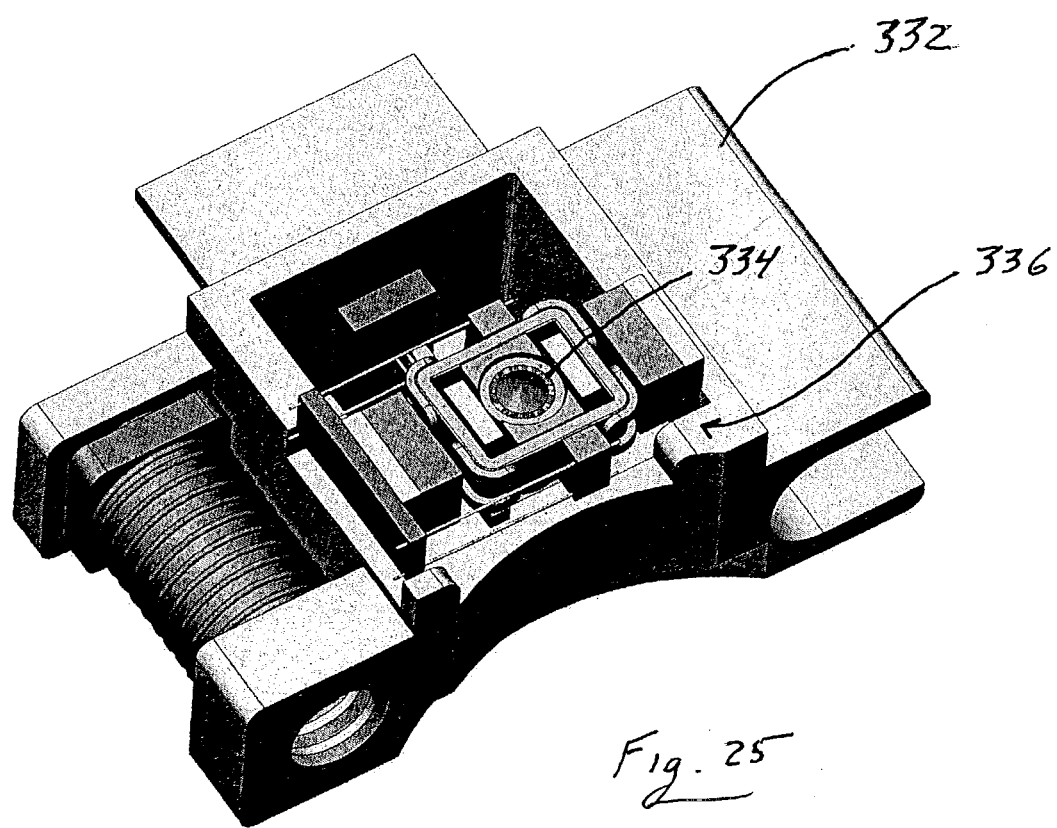
FIG. 25 is a general view of the optomechanical carriage assembly.

FIG. 25 is a general view of optomechanical carriage assembly 282, which includes a carriage body 332, an optics assembly 334, and a fine tracking/focus mechanism 336.

Carriage body 332 is a molded/cast part. Carriage body 332 supports elements of optics assembly 232 and attachments for flexible interconnect 306 and provides the guided surfaces for the motion of carriage assembly 282 along the tracking path. It is coupled via lead screw 296 to coarse tracking motor 292. Carriage body 332 also absorbs heat from the electronics, laser, and servo motors. It may be made of materials which reduce friction so that the driving female threaded element that meshes with lead screw 296 can be molded directly into carriage body 332.

Optics assembly 234, which is described in greater detail below, includes a laser diode, servo detectors, beam distribution and splitting prisms, collimation and objective lenses, a wave retardation plate, a reflective position flag, and a reflective power monitoring surface. In addition, some of the detectors may be mounted on substrates which also include signal amplification electronics.

Fine tracking/focus mechanism 336 includes shared magnetic circuits and five coils that together comprise a two-axis voice coil motor used to position the readout objective lens (which is also part of optics assembly 334).

Figure 26:
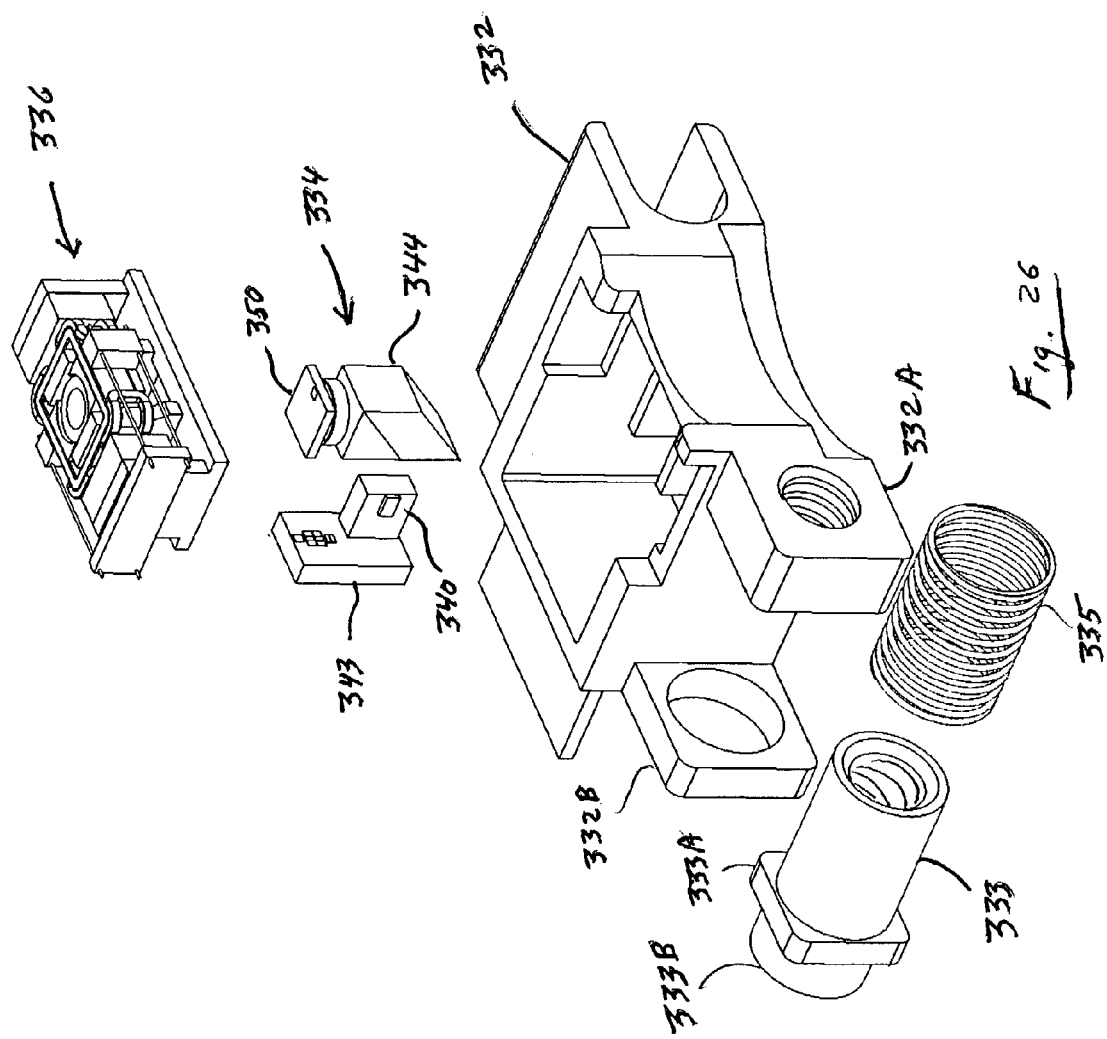
FIGS. 26 and 27 are exploded views of the optomechanical carriage assembly.
Figure 27:
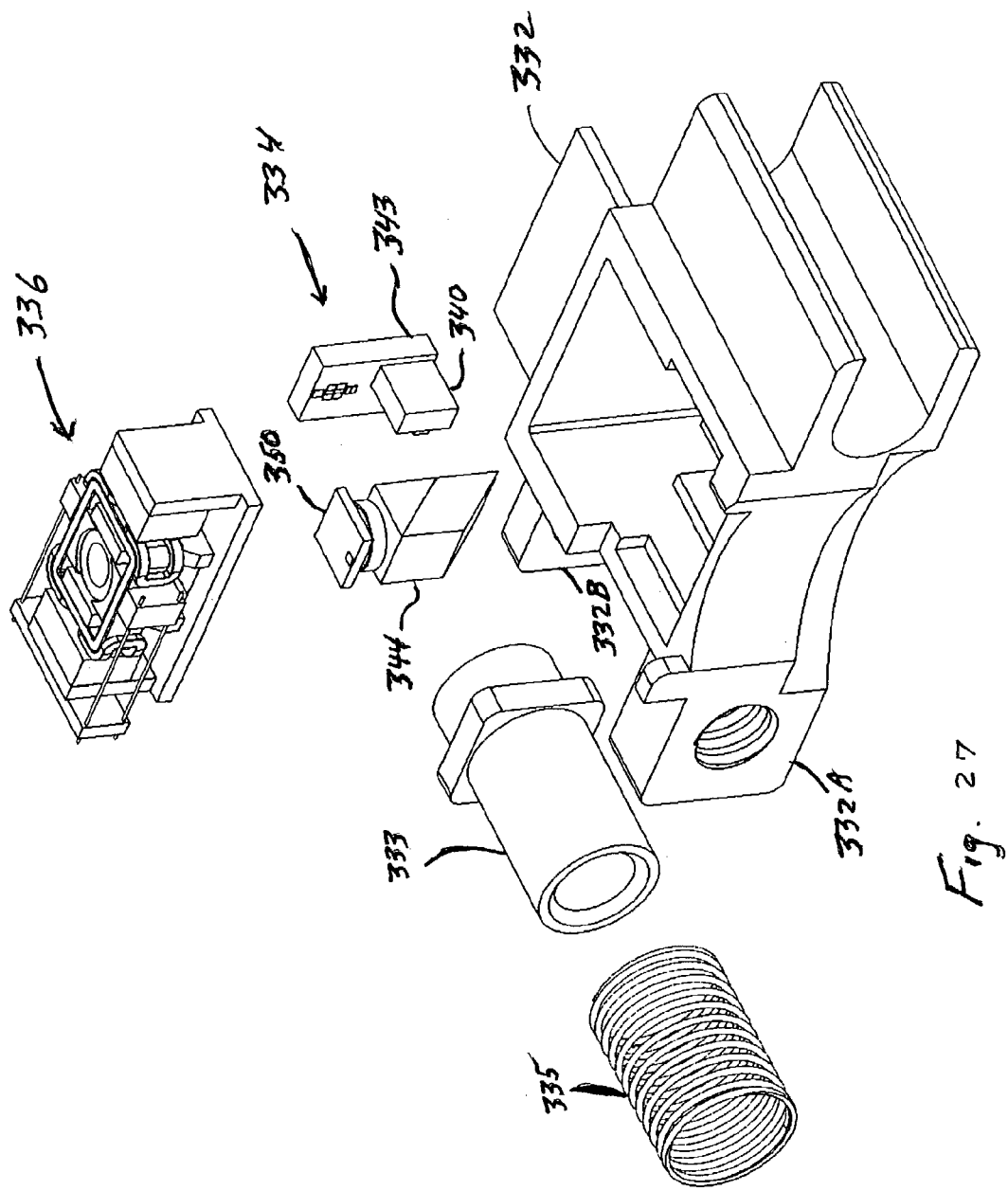

FIGS. 26 and 27 are exploded views of optomechanical carriage assembly 282 taken from different angles. Also shown in FIGS. 26 and 27 are an anti-backlash mechanism that includes a threaded sleeve 333 and a compression spring 335. Carriage body 332 includes a first flange 332A which contains a threaded aperture that, as noted above, meshes with lead screw 296, and a second flange 332B that contains an unthreaded aperture. The central aperture of sleeve 333 likewise threaded to mesh with lead screw 296. Sleeve 333 is installed between flanges 332A and 332B with a round end 333B projecting into the hole of flange 332B and with compression spring 335 enclosing sleeve 333 and butting against flange 332A and a shoulder 333A of sleeve 333. When lead screw 296 is threaded into flange 332A and sleeve 333, compression spring 335 exerts a gentle outward pressure against flange 332A and sleeve 333. This prevents any slack or lost motion between optomechanical carriage assembly 282 and lead screw 296.

Optics Assembly

Figure 28:
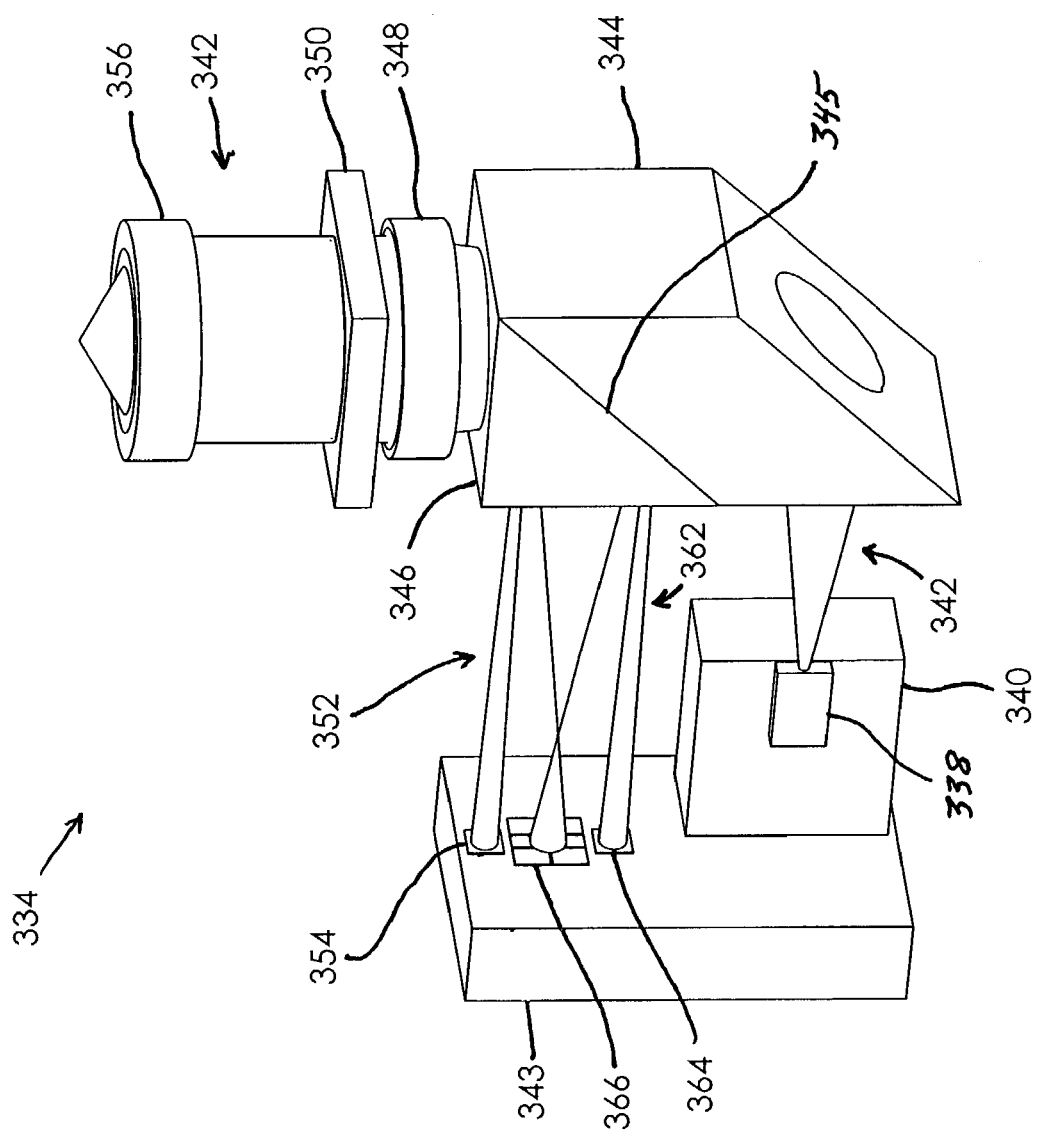
FIG. 28 is a schematic view of the optics assembly.

FIG. 28 illustrates a schematic view of optics assembly 334. For purposes of this description, the terms "up," "down," "above" and "below" are used in relation to FIG. 28.

The laser beam originates in a laser diode 338. Laser diode 338 preferably provides a blue laser beam with a wavelength of 405 nm. Laser diode may be a Cree model 405LD 500 or a Sanyo model LS5000. Use of a 405 nm blue laser beam permits the track pitch on disc 10 to be reduced to 0.37 μm from the pitch of 0.74 μm required for a typical 600–700 nm red laser beam, for example.

Laser diode 338 is mounted on a heat sink 340 near the bottom of a laser diode/detector substrate 343. A laser beam 342 emanates from laser diode 338 as a diverging, elliptical cone of light. Laser beam 342 enters a rhombic prism 344 and is directed upward by internal reflection in prism 344.

Rhombic prism 344 is attached to a half cube 346. A diagonal surface between the rhombic prism 344 and half cube 346 is coated with a polarization sensitive layer, which forms a beam-splitting interface 345. The predominant polarization of laser beam 342 causes it to pass through beam-splitting interface 345 and continue upward. After laser beam 342 leaves half cube 346, it enters a collimating lens 348. Collimating lens 348 converges laser beam 342 just enough to make the beam a collimated (parallel ray) beam. Above collimating lens 348 is a quarter-wave retardation plate 350, which rotates the polarization of laser beam 342 by 45 degrees about the axis of the beam.

Figure 29:
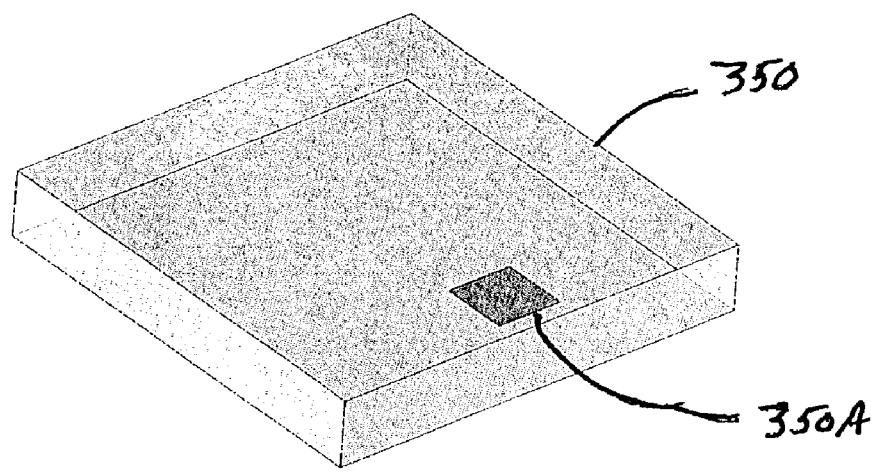
FIG. 29 shows the quarter-wave plate.

On the upper surface of quarter-wave plate 350, shown in FIG. 29, is a small silvered area 350A, which reflects a portion of the upward bound laser beam 342 back through quarter-wave plate 350. That reflected "beamlet" has its polarization rotated another 45 degrees as it passes again through quarter-wave plate 350, so that its polarization is now rotated 90 degrees from the polarization of laser beam 342 when it left collimating lens 348. When this "beamlet" encounters beam-splitting interface 345, it is now reflected instead of transmitted. This reflected "beamlet", shown at 352 in FIG. 28, is directed to a laser diode 354 on substrate 343, where it is used to modulate the laser power control loop.

Figure 30:
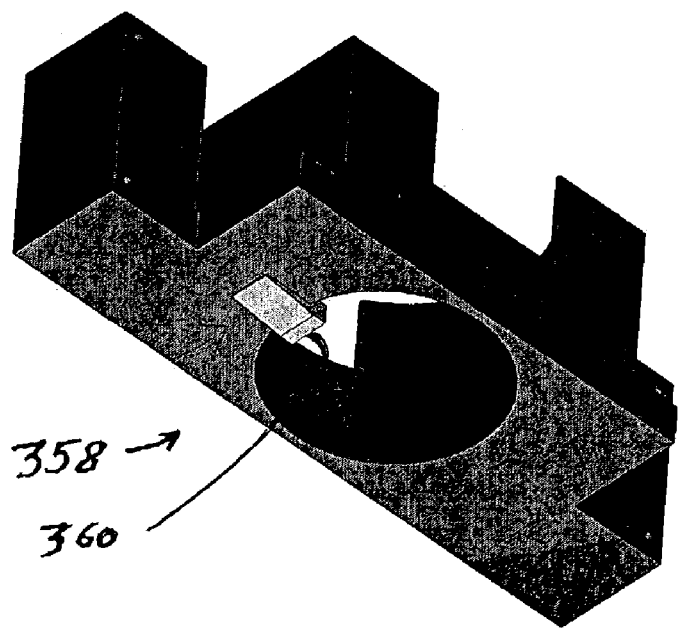
FIG. 30 shows the objective lens mount.

The remainder of the outbound beam (minus the "beamlet") proceeds upward towards an objective readout lens 356, which is supported by an objective lens mount 358, shown in FIG. 30 from below. Protruding from objective lens mount 358 is small, shaped reflective element 360, which returns another portion of laser beam 342. Reflective element 360 may be made of metal, and may be added to lens mount 358, or it may comprise a reflective coating applied to a molded plastice feature. Its reflective surface may be planar or curved.

The portion of laser beam 342 that is reflected from reflective element 360 is reflected in a direction that is determined by the position of lens mount 358 along the "tracking axis." The "tracking axis" of lens mount 358, described further below, nominally coincides with the axis along which laser beam 342 is reflected upward by the rhombic prism 344. This second "beamlet" 362 returns in the same way as the first "beamlet" 352, making a second pass through quarter-wave plate 350, but on the opposite side of the main laser beam 342. The polarization of second "beamlet" 362 is likewise rotated another 90 degrees and is therefore reflected by beam splitting interface 345 towards substrate 343 where it illuminates a split position-sensitive photodetector 364. Photodetector 364 is split horizontally, and the power of "beamlet" 362 is distributed vertically between the two halves of split photodetector 364 in proportion to tracking axis of objective lens mount 358. The position of the spot formed by "beamlet" 362 on split photodetector 364 thus provides an indication of the position of the fine servo motor (described below) that controls the orientation of the tracking axis of lens mount 358.

Figure 31:
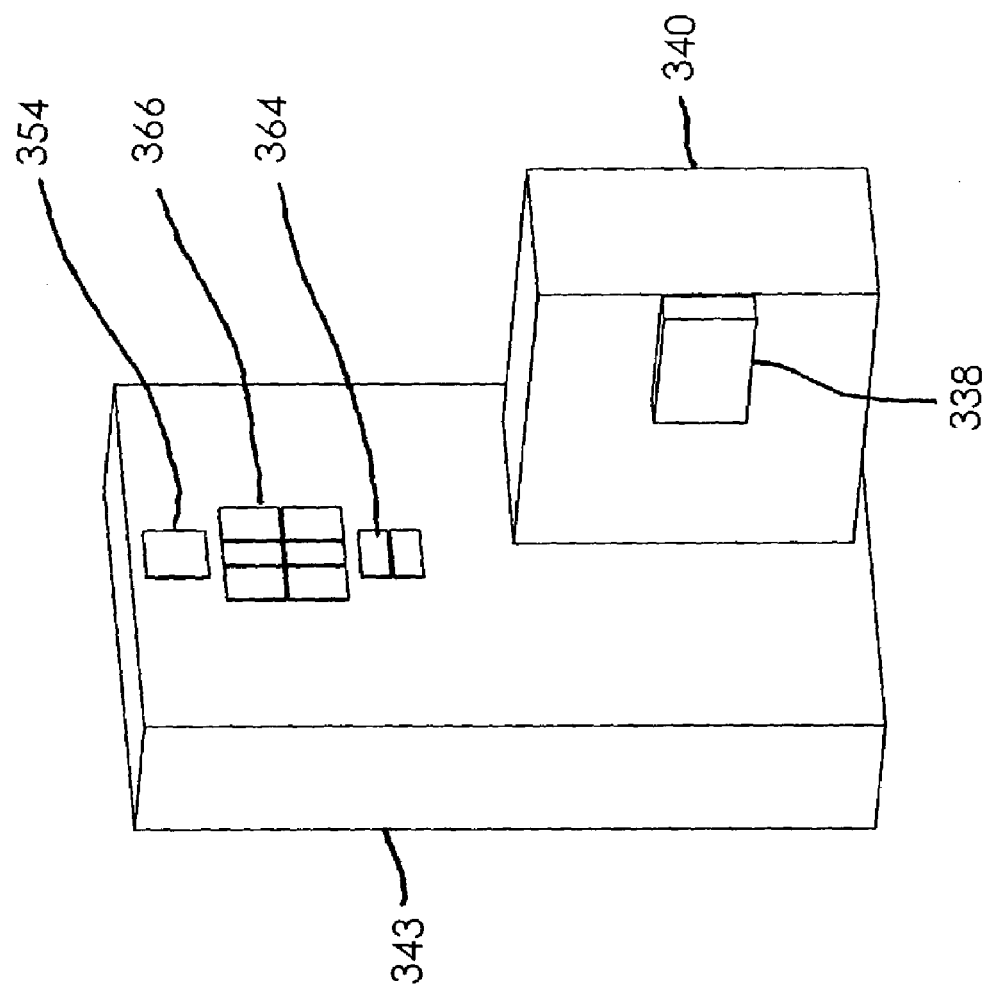
FIG. 31 shows the respective positions of the laser diode and tracking photodetector on the laser diode/detector substrate.

FIG. 31 shows the respective positions of laser diode 354 and photodetector 364 on substrate 343.

Referring again to FIG. 28, the rest of laser beam 342 proceeds upward through the readout objective lens 356 and is focused on the grooves on optical disc 116 (not shown). Laser beam 342 is reflected by the disc and passes back through objective lens 356, quarter-wave plate 350 and collimating lens 348. Laser beam 342 is then reflected at beam splitting interface 345 towards laser diode/detector substrate 343, where it is incident on a servo photodetector 366. As shown in FIG. 31, servo photodetector 366 has six segments (photodiodes). The segmented structure of servo photodetector 366 allows a determination of the beam distribution and intensity as it returns from the disc and is reflected at beam splitting interface 345.

The numerical aperture of lens 356 is high (e.g., approximately 0.72) and therefore, when the collimated beam 342 is focused on a reflective surface, a "cateye" reflector is formed. As a result, when laser beam 342 is focused exactly on the disc, the reflected beam will effectively retrace its path and re-form as a collimated beam after passing back through objective lens 356. If the position of objective lens 356 is above or below the position that creates an exact focus on the disc, the return beam below objective lens 356 will converge or diverge, i.e., when lens 356 is too close to the disc, the return beam will be slightly convergent, and when lens 356 is too far from the disc, the return beam will be slightly divergent. The variation of the convergence or divergence with focus error is proportional over a small range of focus error, and creates differences in the outputs of the segments of servo photodetector 366. The focus error is determined by taking the sums and differences of the segments of servo photodetector 366 in horizontal and diagonal groups.

Because the surface of the disc is grooved, the return beam is also diffracted. When the beam is centered on a track, the pattern of the return beam projected onto the servo photodetector 366 is essentially three superimposed spots: one bright central (or zero-order) spot, and two fainter, first-order diffracted spots, one above and one below the central spot and symmetrically overlapping the central spot. When the focused outbound beam moves slightly off-track, the projected pattern of the reflected beam shifts, and the diffracted spots are no longer symmetrically placed. This asymmetry produces differential intensity changes along the vertical axis of servo photodetector 366. Tracking error signals are obtained by observing the difference between the sum of the outputs of the upper segments and the sum of the outputs of the lower segments.

The intensity changes caused by the imprinted data pits are detected by monitoring the sum of the outputs of all segments of servo photodetector 366.

Algorithms for controlling the tracking and focus of the laser beam are well known and available from many sources. One tracking and focus system is described in Kadlec et al., U.S. Patent Application Publication No. US 2002/0110056, entitled "Digital Focus And Tracking Servo System," filed Sep. 10, 2001, and references cited therein, all of the foregoing being incorporated herein by reference in their entirety.

Fine Servo Motor

Figure 32:
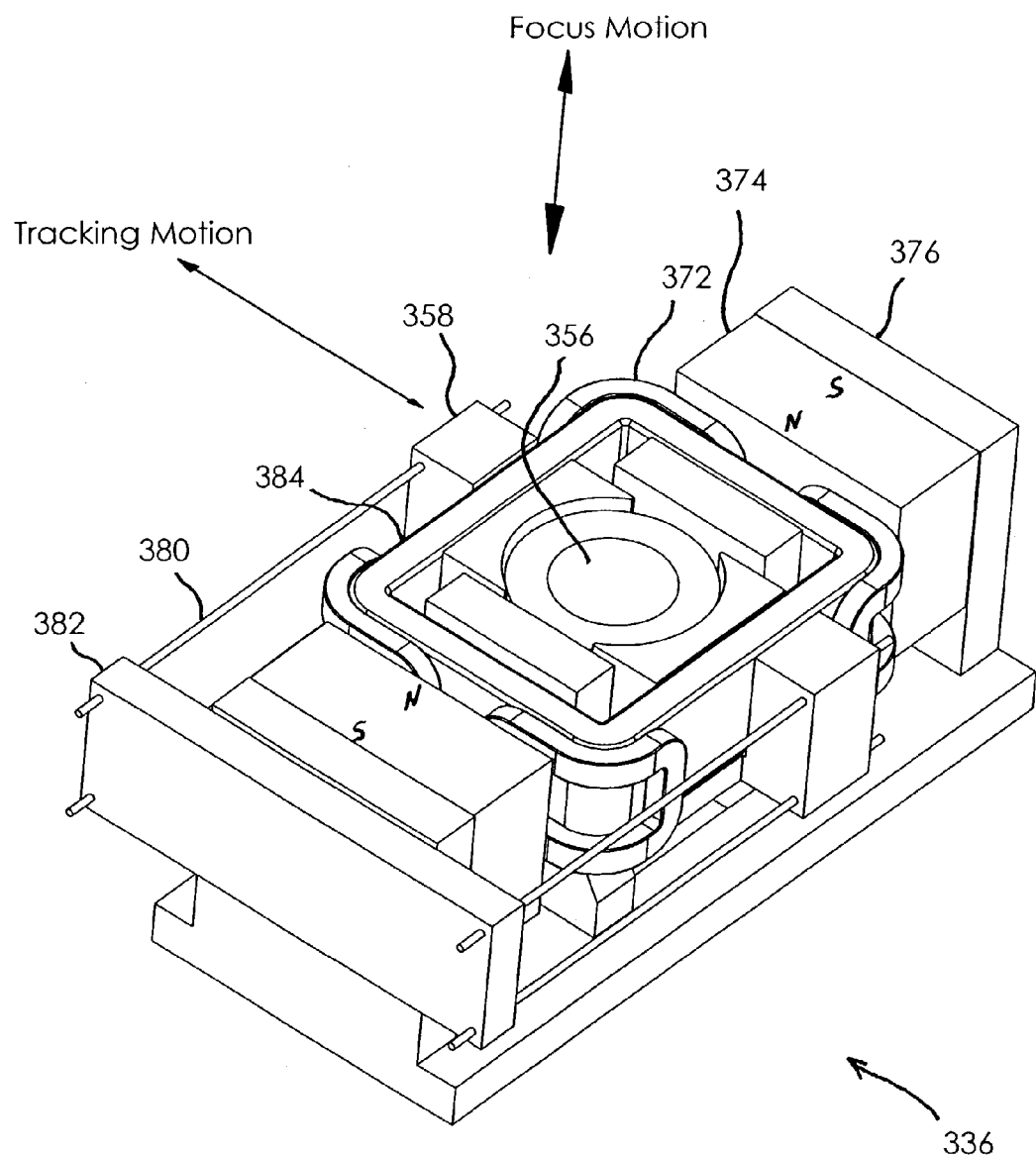
FIG. 32 is a view of the fine tracking/focus mechanism.
Figure 33:
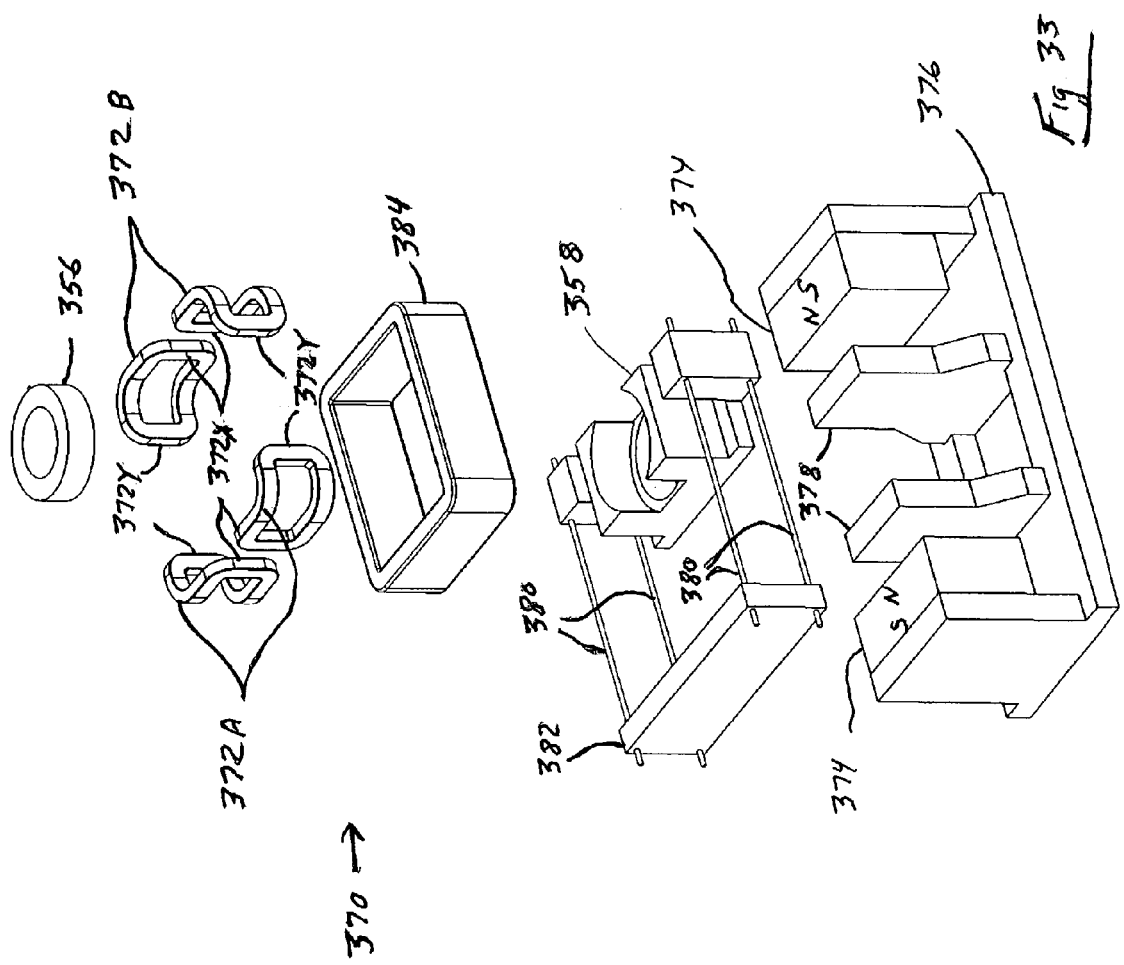
FIG. 33 an exploded view of the fine tracking/focus mechanism.

Fine tracking/focus mechanism 336 includes a fine servo motor 370. In response to control signals, fine servo motor 370 adjusts the position of objective readout 356 lens so as to maintain the laser beam in focus and follow the tracks on the disc. FIG. 32 is a view of fine tracking/focus mechanism 336, and FIG. 33 is an exploded view of fine tracking/focus mechanism 336 showing the components of fine servo motor 370. Objective readout lens 356, shown at the center of fine tracking/focus mechanism 336, is a component of both optics assembly 334 and fine servo motor 370. As shown, objective lens mount 358 fits in a slot formed between walls 378 in a pole assembly 376.

The tracking motion of objective lens 356 is created by moving objective lens mount 358 in the direction of the "tracking motion" arrows in FIG. 32. This motion is created with four "bent" tracking coils 372, subdivided into two groups 372A and 372B. Fine servo motor 370 contains two permanent magnets 374 which are affixed to pole assembly 376 with like poles facing the center of pole assembly 376. (In FIGS. 32 and 33 the north poles are shown facing inward.) This forms two magnetic gaps, one on each side of the center of pole assembly 376, with magnetic flux vectors directed symmetrically inward or outward. The four tracking coils 372 are positioned such that one vertical arm 372X of each coil is located in the one of the magnetic gaps. (Conversely, the remaining vertical arms 372Y, shown in FIG. 33, are outside the magnetic gaps between magnets 374.) Coils 372 are connected in series in such a manner that the currents in the vertical arms 372X of coils 372A flow in the opposite direction to the currents in the vertical arms 372X of coils 372B, i.e., when current flows downward in the vertical arms 372X of coils 372A, the current flows upward in the vertical arms 372X of coils 372B, and vice-versa. Depending on the direction of the currents, coils 372 and the remainder of fine servo motor 370 (including lens 356) will be subjected to an electromotive force in one of the directions of the "tracking motion" arrows.

Objective lens mount 358 is attached to four flexure wires 380, the other ends of which are attached to a mounting plate 382. Flexure wires 380 allow lens mount 358 and lens 356 to move in the direction of the "tracking motion" and "focus motion" arrows shown in FIG. 32 but prevent it from moving in an direction orthogonal to the tracking and focus motions.

Two of flexure wires 380 also provide the electrical connections for tracking coils 372. Both mounting plate 382 and objective lens mount 358 are made of an insulating material such as a plastic resin having a Young's modulus of $2.8 \times 10^4$ MPa ($4.4 \times 10^6$ psi) or higher. Thus, flexure wires 380 are insulated from the rest of the assembly by the mounting plate 382 and objective lens mount 385.

Flexure wires 380 can be made of beryllium copper or some other high yield-strength material to minimize damage in operation or assembly. Flexure wires 380 should have a low electrical resistance to minimize any damage from heating. They are preferably corrosion resistant and could be coated or sleeved for vibration damping, e.g., with a thin elastomer film or molded part.

Using flexure wires 380 to carry current to tracking coils 372 allows the movement of lens 356 to approximate a smooth, orthogonal movement in tracking and focus directions. Using other wires to make the electrical connections may introduce moments which disturb this motion in an uncontrollable way.

The vertical motion necessary to focus lens 356 is provided by a rectangular coil 384, which is enclosed within the four tracking coils 372 when fine servo motor 370 is assembled (FIG. 32). Coil 384 is positioned in the magnetic gaps between permanent magnets 374, and provides summed Lorentz forces which move coil 384 up or down when current flows through it. For the reasons described above, coil 384 is preferably supplied with current through the two flexure wires 380 that are not used to supply current to tracking coils 372.

To minimize any tilting of lens 356 it is desirable that the net electromotive force vectors provided by coils 372 and 384 in the tracking and focus directions, respectively, pass through the central of gravity of fine servo motor 370 (including lens 356) and objective lens mount 358.

It will be understood that optics assembly 334 is only one embodiment of an optics assembly that could be used in a disc drive of this invention. Optics assemblies having other structures may be used in disc drives fall within the broad scope of this invention.

Figure 34:
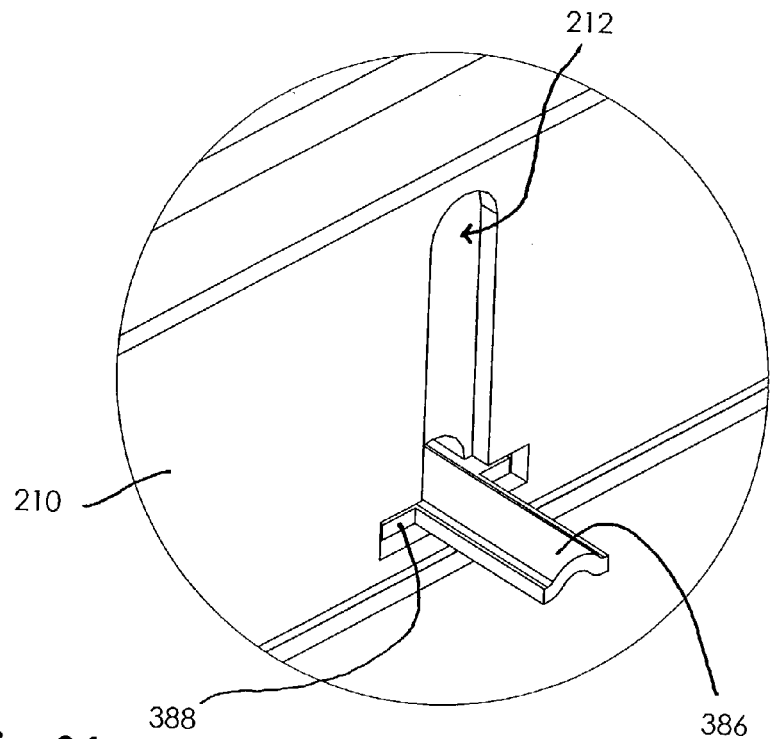
FIG. 34 is a view of the latch mechanism.

As noted above, the user presses side release buttons 202 together in order to unlatch drive mechanism 22 from the closed position and thereby enable a cartridge to be inserted into the disc drive. Many different forms of latch mechanism may be used to hold drive mechanism 22 in the closed position. FIG. 34 shows one possibility. One of side release buttons 202 (not shown) is affixed to the end of one of pin members 386. A shank 388 projects from both sides of pin member 386 and fits into the lateral section of the T-shaped slot 212 in guide 210 when drive mechanism 22 is in its closed, latched condition. Pin members 386 are spring-biased, and when the user presses release buttons 202 together, he acts against the force of the spring. As shown in FIGS. 18 and 22, pin members 386 are mounted into recesses 387 in body member 299, and the ends of pin members on which release buttons 202 are affixed project through openings 389 in body member 299.

As pins 386 move axially inward (toward drive mechanism 22) shanks 388 clear the guides 210, allowing pins 386 to slide upward in the vertical sections of T-shaped slots 212 and moving drive mechanism 22 from its closed position (FIG. 20A) to its open position (FIG. 20B). After the user has inserted a cartridge, he depresses load button 302, forcing drive mechanism downward. Pins 386 slide downward in the T-shaped slots 212 until shanks 388 reach the lateral sections of T-shaped slots 212 at which point shanks are again forced into the lateral sections of T-shaped slots 212, latching drive mechanism in the closed position.

When the disc has been played, the user again presses buttons 202 together and the above process is repeated. This time, however, a magnet (not shown) in drive mechanism 22 lifts leaf spring 222, freeing barb 240 from the recess 193 in cartridge 10. With barb 240 disengaged from recess 193, spring arm 220 pushes the cartridge out of cartridge tray 208 to the point where it can be removed by the user.

Coarse Tracking Mechanism Using Linear Motor

Figure 35:
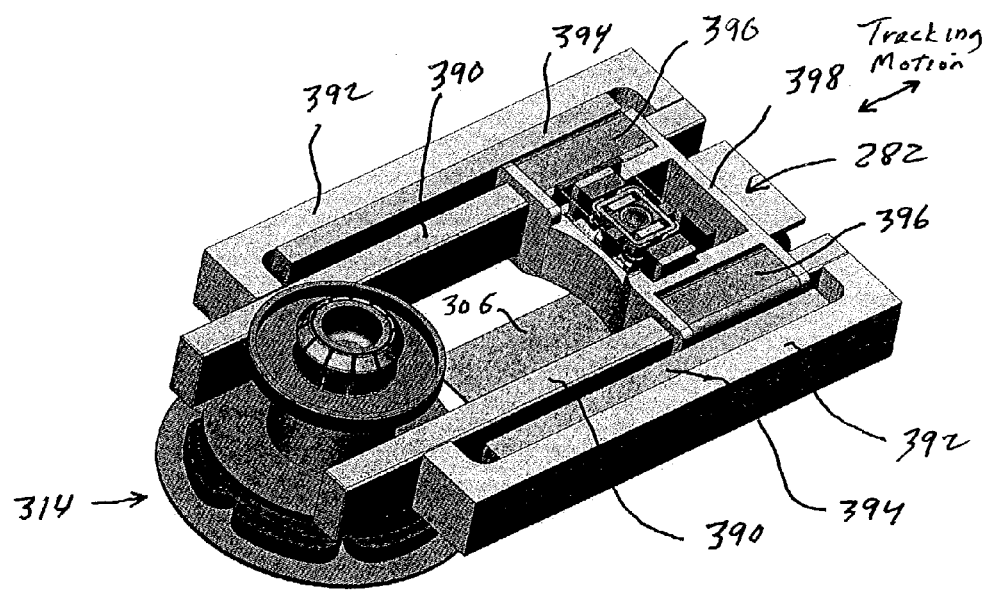
FIG. 35 shows an embodiment in which a linear voice coil motor is used to move the optomechanical carriage assembly.

FIG. 35 shows an alternative embodiment in which a linear voice coil motor is used instead of a rotary motor and lead screw to move optomechanical carriage assembly 282. The linear motor may provide a higher bandwidth and may reduce the amount of travel needed in the fine tracking motor. On the other hand, the linear motor may require more current to operate than the lead screw system.

In the case of the linear motor method for coarse actuation, the following innovations are proposed:

FIG. 35 shows the spindle motor assembly 314 and carriage assembly 282 as it would be implemented using a voice coil motor. Carriage assembly 282 travels on a pair of rectilinear rods 390. Rods 390 serve as inner pole pieces for magnetic circuits that include U-shaped outer pole pieces 392 and permanent magnets 394. Magnets 394 are installed with their field lines all pointing inward or outward with respect to the vertical central plane positioned at the midpoint between magnets 394 and rods/pole pieces 390 and 392. Thus the orientation of the magnetic fields is transverse to the tracking axis along which carriage assembly 282 moves. The magnetic flux runs in a circuit from the inner faces of magnets 394 across the gap to the rods/pole pieces 390. In rods/pole pieces 390 half of the total flux goes to the left (towards spindle motor assembly 314) and half goes right, and then the flux (both halves) returns to the magnet through the U-shaped outer pole pieces 392.

On opposite sides of carriage assembly 282 are coils 396. Coils 396 are wired in series or parallel to cause the Lorentz forces to add when current flows through them. Preferably, PTFE, molybenum disulfide or another specialized anti-friction coating is placed on inner pole pieces 390 and added to the plastic resin used to make the carriage body 398. Thus, depending on the direction of the currents in coils 396, carriage assembly 282 moves in one direction or the other along the tracking axis. Focus control is provided by varying the current in a single coil positioned between two permanent magnets, in the same manner as described above in connection with FIGS. 32 and 33.

Carriage assembly 282 is connected to a flexible interconnect which provides all of the servo inputs, coarse and fine, and the servo and data output.

While specific embodiments of this invention have been described above, it will be apparent to those of skill in the art that many additional and alternative embodiment are within the broad scope of this invention.

We claim:

1. A disc drive for an optical data storage disc, said disc drive comprising:
   a body assembly having a connector located at a first end of said body assembly and comprising a cartridge tray for holding a cartridge which contains said optical data storage disc, said cartridge tray having an opening for receiving said cartridge, said opening being located at a second end of said body assembly opposite said first end; and
   a pod comprising a cover piece, said cover piece housing a spindle motor assembly and an optomechanical carriage assembly, said pod being disposed adjacent said second end of said body assembly and being movable between an open position in which said opening of said cartridge tray is exposed to an exterior of said disc drive and said cartridge may be inserted into said cartridge tray and a closed position in which said opening is closed off from said exterior of said disc drive and said spindle motor assembly engages said disc;
   wherein a section of said body assembly adjacent said connector is sized for insertion into a data storage card slot.

2. The disc drive of claim 1 wherein said section of said body assembly is sized for insertion into a slot designed to receive a CompactFlash storage card.

3. The disc drive of claim 1 wherein said section of said body assembly is sized for insertion into a data storage card slot that is designed to receive a memory card having a width in a direction transverse to a direction of insertion of approximately 43 mm and a thickness of approximately 3.3 mm.

4. The disc drive of claim 1 wherein said body assembly has first and second principal surfaces, said pod being movable linearly between said open and closed positions in a direction perpendicular to said first principal surface of said body assembly.

5. The disc drive of claim 1 wherein said body assembly includes first and second portions, a substantial part of said first portion being sized to fit in said memory card slot, said second portion not being sized to fit in said memory card slot, said pod being adjacent to said second portion when said drive mechanism is in said closed position.

6. The disc drive of claim 5 wherein said cartridge tray extends into said first portion of said body assembly.

7. The disc drive of claim 5 wherein a portion of said cartridge extends into said first portion of said body assembly when said cartridge is inserted in said disc drive.

8. The disc drive of claim 5 wherein a portion of said disc extends into said first portion of said body assembly when said cartridge is resident in said disc drive.

9. The disc drive of claim 5 wherein said first portion is about 40 mm in length.

10. The disc drive of claim 9 wherein said second portion is about 28 mm in length.

11. The disc drive of claim 5 wherein said second portion is thicker than said first portion.

12. The disc drive of claim 1 wherein said body assembly has first and second principal surfaces, said pod being located adjacent said first principal surface, said first principal surface having an opening which allows said spindle motor assembly to engage said disc.

13. The disc drive of claim 12 wherein said body assembly includes an upward facing guide, said guide containing a slot, a feature of said pod sliding in said slot as said pod moves between said open and closed positions.

14. The disc drive of claim 1 wherein said spindle motor assembly comprises a spindle shaft and an expandable collet attached to said spindle shaft.

15. The disc drive of claim 14 wherein said collet includes a plurality of flexible fingers arrayed circumferentially around a central hub.

16. The disc drive of claim 15 wherein said spindle motor assembly comprises a disc platen, said disc platen being attached to said spindle shaft.

17. The disc drive of claim 16 wherein each of said flexible fingers includes a canted leading surfaces and a trailing surface, said trailing surfaces of said flexible fingers being positioned so as to hold a disc against said platen.

18. The disc drive of claim 1 wherein said pod comprises an optics assembly, said optics assembly comprising a laser diode, said laser diode emitting a blue laser beam.

19. The disc drive of claim 18 wherein said laser beam has a wavelength of about 405 nm.

20. The disc drive of claim 18 wherein said optics assembly comprises an objective lens, said objective lens having a numerical aperture of approximately 0.72.

* * * * *